(12) United States Patent
Piva

(10) Patent No.: US 11,787,252 B2
(45) Date of Patent: Oct. 17, 2023

(54) WELDLESS VEHICULAR SUSPENSION CONTROL ARM

(71) Applicant: Multimatic Inc., Markham (CA)

(72) Inventor: Brian William Piva, Uxbridge (CA)

(73) Assignee: MULTIMATIC INC., Markham (CA)

( * ) Notice: Subject to any disclaimer, the term of this patent is extended or adjusted under 35 U.S.C. 154(b) by 91 days.

(21) Appl. No.: 17/609,338

(22) PCT Filed: Sep. 4, 2020

(86) PCT No.: PCT/US2020/049333
§ 371 (c)(1),
(2) Date: Nov. 5, 2021

(87) PCT Pub. No.: WO2021/046302
PCT Pub. Date: Mar. 11, 2021

(65) Prior Publication Data
US 2022/0144031 A1    May 12, 2022

Related U.S. Application Data

(60) Provisional application No. 62/979,532, filed on Feb. 21, 2020, provisional application No. 62/896,303, filed on Sep. 5, 2019.

(51) Int. Cl.
*B60G 7/00* (2006.01)

(52) U.S. Cl.
CPC .......... *B60G 7/001* (2013.01); *B60G 2204/41* (2013.01); *B60G 2204/416* (2013.01);
(Continued)

(58) Field of Classification Search
CPC ................ B60G 7/001; B60G 2204/41; B60G 2204/416; B60G 2206/017;
(Continued)

(56) References Cited

U.S. PATENT DOCUMENTS 2,556,767 A * 6/1951 McCann .................. B60G 3/20
280/124.139
5,695,213 A * 12/1997 Nakamura ............. B60G 7/001
280/124.134
(Continued)

FOREIGN PATENT DOCUMENTS

CN       207790234 U    8/2018
DE    102004016723 A1    10/2005
(Continued)

OTHER PUBLICATIONS

Japanese Office Action for Japanese Application No. JP 2022-511385 dated Mar. 22, 2023.
(Continued)

*Primary Examiner* — Paul N Dickson
*Assistant Examiner* — Timothy Wilhelm
(74) *Attorney, Agent, or Firm* — Carlson, Gaskey & Olds, P.C.

(57) ABSTRACT

A vehicular suspension control arm comprises a first arm component and a second arm component formed from sheet metal, each arm component comprising an outer wall and two side walls, bushing connecting means adjacent a first end, at least one bracket receiving rivet aperture adjacent a second end, at least one component connecting rivet aperture located between the first end and the second end, a ride bushing and a handling bushing, a ball joint bracket comprising bracket rivet apertures corresponding to the at least one bracket receiving rivet aperture adjacent the second end of each of the first and second arm components and a plurality of rivets. When constructed, the ball joint bracket is riveted to both the first and second arm components adjacent the second end thereof via the at least one bracket receiving rivet aperture and the corresponding at least one bracket rivet aperture, the first arm component is riveted to the second arm component at the at least one component
(Continued)

connecting rivet aperture, the ride bushing is connected at the first end of the first arm component and the handling bushing is connected at the first end of the second arm component.

17 Claims, 20 Drawing Sheets

(52) U.S. Cl.
CPC .. *B60G 2206/017* (2013.01); *B60G 2206/122* (2013.01); *B60G 2206/8206* (2013.01)

(58) Field of Classification Search
CPC ...... B60G 2206/122; B60G 2206/8206; B60G 2206/124; B60G 2206/16; B60G 2206/722; F16B 5/04
See application file for complete search history.

(56) References Cited

U.S. PATENT DOCUMENTS

| | | | | |
|---|---|---|---|---|
| 5,918,893 A * | 7/1999 | Marquardt | ............. | B60G 7/001 280/124.109 |
| 5,992,867 A * | 11/1999 | Kato | ...................... | B60G 7/001 280/124.134 |
| 6,152,433 A * | 11/2000 | Hettich | ................... | B60G 7/001 180/352 |
| 6,572,126 B2 * | 6/2003 | Tunzini | ................... | B60G 7/001 280/124.134 |
| 6,719,108 B2 * | 4/2004 | Hasegawa | ............... | B60G 7/001 267/141 |
| 6,905,129 B2 * | 6/2005 | Runte | .................... | B60G 7/001 280/124.134 |
| 7,163,219 B2 * | 1/2007 | Seksaria | ................ | B60G 7/001 280/124.133 |
| 7,703,783 B2 * | 4/2010 | Miyawaki | ................ | B60G 7/02 280/124.134 |
| 7,938,417 B2 * | 5/2011 | Ersoy | ..................... | B60G 7/005 280/124.134 |
| 8,167,325 B2 * | 5/2012 | Lee | ......................... | B60G 7/001 280/124.135 |
| 8,388,001 B2 * | 3/2013 | Mielke | ................... | B60G 7/001 280/124.134 |
| 8,398,102 B2 * | 3/2013 | Monchiero | ............ | B60G 7/001 280/124.135 |
| 8,414,003 B2 * | 4/2013 | Yu | ........................... | B60G 7/001 280/124.134 |
| 8,459,674 B2 * | 6/2013 | Mielke | ................... | B60G 7/001 280/124.134 |
| 8,690,176 B2 * | 4/2014 | Perry | ..................... | B21D 53/88 280/124.134 |
| 8,708,359 B2 * | 4/2014 | Murray | .................... | B60G 3/20 280/124.148 |
| 9,016,703 B2 * | 4/2015 | Rowe | ..................... | B60G 7/008 267/273 |
| 9,278,595 B2 * | 3/2016 | Ohta | ......................... | B60G 7/02 |
| 9,421,838 B2 * | 8/2016 | Morino | ................. | B60G 7/001 |
| 9,469,173 B2 * | 10/2016 | Murray | ................. | B60G 3/202 |
| 9,481,220 B2 * | 11/2016 | Meier | ..................... | B60G 7/005 |
| 9,676,241 B2 * | 6/2017 | Eleazar | .................. | B60G 7/001 |
| 9,789,532 B2 * | 10/2017 | Di Serio | ............... | B60G 7/001 |
| 10,160,275 B2 * | 12/2018 | Meier | .................... | B60G 7/001 |
| 10,286,741 B2 * | 5/2019 | Kenmotsu | ............. | B60G 7/008 |
| 10,981,424 B2 * | 4/2021 | Mainz | .................... | B60G 7/001 |
| 11,135,885 B2 * | 10/2021 | Meyer | ..................... | B23P 15/00 |
| 11,173,762 B2 * | 11/2021 | Seethaler | .............. | B60G 7/001 |
| 2004/0135337 A1 * | 7/2004 | Alesso | .................. | B60G 7/001 280/124.134 |
| 2006/0151970 A1 * | 7/2006 | Kaminski | ................ | B60G 3/06 264/46.7 |
| 2007/0228684 A1 * | 10/2007 | Bowers | .................... | B60G 3/20 280/124.134 |
| 2010/0084834 A1 * | 4/2010 | Ersoy | .................... | B60G 7/001 280/124.1 |
| 2011/0298192 A1 * | 12/2011 | Yu | .......................... | B60G 7/001 280/124.134 |
| 2012/0021241 A1 | 1/2012 | Perry et al. | | |
| 2012/0098228 A1 * | 4/2012 | Wilson | ................... | B60G 7/005 280/124.134 |
| 2018/0154719 A1 * | 6/2018 | Kwon | ..................... | F16C 11/06 |
| 2018/0326803 A1 * | 11/2018 | Meyer | .................... | B60G 7/001 |

FOREIGN PATENT DOCUMENTS

| | | | |
|---|---|---|---|
| DE | 102005011829 A1 | 9/2006 | |
| DE | 102005052336 A1 | 5/2007 | |
| DE | 102006052782 A1 * | 5/2008 | ........... B60G 21/051 |
| DE | 102006052782 A1 | 5/2008 | |
| FR | 3074727 A1 | 6/2019 | |
| JP | 2001336513 A | 12/2001 | |

OTHER PUBLICATIONS

International Search Report and Written Opinion for International Application No. PCT/US2020/049333 dated Dec. 2, 2020.
International Preliminary Report on Patentability for International Application No. PCT/US2020/049333 dated Sep. 8, 2021.

* cited by examiner

WELDLESS VEHICULAR SUSPENSION CONTROL ARM

CROSS-REFERENCE TO RELATED APPLICATIONS

This application claims priority to U.S. Provisional Application No. 62/896,303 which was filed on Sep. 5, 2019, and U.S. Provisional Application No. 62/979,532 which was filed on Feb. 21, 2020, and are incorporated herein by reference.

FIELD OF THE INVENTION

This invention relates to the field of automotive components, in particular an automotive suspension control arm.

BACKGROUND OF THE INVENTION

Most modern road vehicles use some form of suspension system to isolate the passenger compartment from wheel disturbances caused by irregularities in the road surface. These suspension systems normally include some form of energy storage medium such as a spring, a device to control the spring's motion such as a damper, and a linkage arrangement to control the kinematics of the wheel movement. This combination of components is configured to allow the vehicle's wheels to move up and over road irregularities in a controlled manner. The most common form of linkage arrangement is a four-bar linkage configuration, constructed from the spindle assembly, the vehicle body, and two pivoting structural elements commonly referred to as control arms.

FIG. 1 illustrates a common prior art four-bar link configuration. The "A" shaped control arms 1, 2 locate and guide the movement of the spindle assembly 3 relative to the vehicle body 4. The spindle assembly carries the wheel, tire, bearing assembly and brake assembly, which are collectively referred to as the unsprung mass 5 of the vehicle. The unsprung mass also includes a portion of the control arm weight. Owing to the significant energy involved in moving the unsprung mass over road surface disturbances, it is preferable to reduce the combined weight of this subassembly as much as possible. Additionally, since the handling characteristics of the vehicle are directly dependent on the controlled movement of the unsprung components, it is imperative that the control arms have sufficient stiffness and strength to resist the substantial loadings that are imparted upon them.

It is therefore important that suspension control arms be strong and stiff to function well when loaded, as well as light in weight to reduce the unsprung mass. Reducing weight normally results in a reduction of both strength and stiffness. Great ingenuity is required to design parts with reduced weight but equivalent performance characteristics. The operational loads imparted on suspension control arms are discrete and well understood so that non-uniform structures can be developed to provide selective stiffness and strength in the directions and locations required by the application. Vehicle suspension control arms are generally configured in either an "A" or an "L" shape in plan view, depending on the configuration of the body mount to spindle relationship. In either case, the dominant induced loads are in the plane of the "A" or "L" formation and therefore require a high concentration of material to be located around the edges of the "A" or "L" formation to maximize the in-plane second moment of area values.

The requirement for optimized control arm structures to be non-uniform in shape has driven the use of a number of complex manufacturing processes. The most common manufacturing methods associated with vehicle control arm construction are casting, forging and welding of press-formed metal stampings into subassemblies. Owing to the complex shapes involved, it is difficult to manufacture an optimized vehicle control arm from simple press formed metal stampings.

FIG. 2 illustrates a common prior art cast or forged "L" shaped control arm 6.

Casting involves high heat to create molten metal. Although precise shapes can be formed, the control arm tends to be solid with significant attendant weight. Cast control arms are strong but tend to be somewhat brittle. The casting process is more expensive than other manufacturing processes. Although aluminum is lighter than steel and corrosion resistant, it is considerably more expensive.

Forging involves heating metal to the point that it is malleable, then applying significant pressure to force the soft metal into the desired shape. As with casting, the forged part is solid. Although a forged part tends to have greater tensile strength than a cast part, the process is also expensive since significant heat is required and there tends to be a significant amount of scrap. Aluminum lends itself to forging, but the significant scrap adds to the cost, even though it is fairly easily recycled.

The majority of suspension control arms that employ press-formed metal stampings in their construction are configured as closed box sections. FIG. 3 illustrates a section of a typical prior art suspension control arm constructed from two U-shaped press-formed metal stampings 501, 502. This type of structural section typically requires a significant overlap of material to facilitate the required weld fillet joint. This material overlap is ultimately structurally redundant and may result in a heavier solution than alternative cast or forged configurations. If a butt jointed construction is used, without material overlap, the strength and integrity of the welding to create the joint is even more critical and the part is more difficult to manufacture.

Although a single piece control arm may be produced from sheet metal steel in an essentially U-shaped structure, a relatively heavy gage steel is required to handle the significant loads to which the control arm is subject. A heavier part is generally undesirable and the additional cost of material may be prohibitive. Moreover, the U-shaped structure renders it difficult to locate a high concentration of material around the edges of the "A" or "L" formation to maximize the in-plane second moment of area values.

FIG. 4 illustrates a typical prior art control arm with two press-formed metal stampings welded around most of the perimeter of the control arm. First stamping 7 and second stamping 8 are welded as shown in FIG. 3.

Suspension control arms are subjected to two main loading directions, namely, fore-aft and cross car. To resist fore-aft loads such as acceleration and braking, the control arms generally require a set of bushings and a ball joint. It is generally desirable in modern vehicle suspension systems to have a relatively soft suspension in the fore-aft direction to allow the wheel to provide a recessional motion when, for example, impacting a curb. This cushions the impact. This is achieved by having a relatively stiff front rubber bushing and a soft rear bushing. By contrast, it is generally desirable to have a relatively stiff suspension in a cross car direction to facilitate proper tracking of the vehicle when driving around a curve. This is achieved by having a relatively stiff front bushing with the rear bushing not influencing this behaviour.

The stiff front bushing is in line with a ball joint that transmits tractive loads from the wheel. The stiff front bushing is generally referred to as the handling bushing and the soft rear bushing is generally referred to as the ride bushing.

The control arms described above are typically connected to the unsprung mass and the vehicle using a ball joint mounted in a ball joint bracket 9 and a pair of bushings 10, 11. A disadvantage of most prior art control arms produced using the above described techniques is that an aperture for the ball joint at the knuckle end must be welded to the control arm, as illustrated in FIG. 4, or the aperture must be stamped into the press-formed part thus creating an additional step, disruption of the sheet metal and additional scrap. Seats for the bushings must be connected to the control arm, typically by welding. This creates additional welding steps, with the opportunity for misalignment of the bushing seats or welding flaws.

The process of welding tends to disrupt the anti-corrosion coatings on the sheet metal thus exposing the part to corrosion at the weld. Although some parts may be electroplated with a protective coating post-welding, this is often difficult with larger, irregularly shaped parts. Post-welding electroplating of a part is expensive and requires extra processing time and floor space. In addition, welding may result in a joint with uneven strength at various points along the weld. Since control arms are typically subjected to continual stresses while a vehicle is in motion, welding irregularities may result in stress failure at the welds. Welded joints are generally subject to poorer fatigue performance than a jointless metal part. Moreover, the welding process produces a heat-affected zone along both sides of the weld that typically exhibits lower strength than the remainder of the sheet metal which thus reduces the overall strength of the part. Modern welding techniques involve robots, weld cells, welding wire and attendant infrastructure, including post-welding inspection, all of which contribute to the cost of manufacture. Welding also adversely affects the air quality in the welding area and consumes significant electricity.

SUMMARY OF THE INVENTION

Accordingly, it would be advantageous to create a suspension control arm that could provide high inherent stiffness and strength while maintaining relatively low mass using a low cost manufacturing technique such as sheet metal press-forming. It has been proven that for large volume applications such as those dictated by the automotive industry, sheet metal press-forming is the most cost-effective method of manufacturing structural components. Most vehicles currently produced employ a body structure and selected subframes constructed almost entirely from either aluminum or steel stampings manufactured using press-forming techniques. An aim of the present invention, therefore, is to utilize metal press-forming in the manufacture of a vehicle suspension control arm.

It would also be advantageous to produce a control arm using relatively light weight, pre-coated, sheet metal steel without the use of welding. In addition, reduced capital costs for equipment and floor space, reduced costs of materials and energy, reduced inspection costs, reduced part fatigue and improved vehicle performance and fuel efficiency owing to lighter weight parts, would all be beneficial.

In an embodiment of the present invention, a structural element comprising a vehicle suspension control arm is constructed from a pair of complex, single piece, sheet metal stamped components formed from a material of uniform thickness. The components are joined without welding to form the correct plan view shape, namely an "A", "L" or other appropriate shape for the application.

In a principal aspect of the invention, a vehicular suspension control arm comprises a first arm component and a second arm component formed from sheet metal, each arm component comprising an outer wall and two side walls, bushing connecting means adjacent a first end, at least one bracket receiving rivet aperture adjacent a second end, at least one component connecting rivet aperture located between the first end and the second end, a ride bushing and a handling bushing, a ball joint bracket comprising bracket rivet apertures corresponding to the at least one bracket receiving rivet aperture adjacent the second end of each of the first and second arm components, and a plurality of rivets, such that when constructed, the ball joint bracket is riveted to both the first and second arm components adjacent the second ends thereof via the at least one bracket receiving rivet aperture and the corresponding bracket rivet aperture, the first arm component is riveted to the second arm component at the corresponding at least one arm component connecting rivet aperture, the ride bushing is connected at the first end of the first arm component and the handling bushing is connected at the first end of the second arm component.

In a further aspect of the invention, a vehicular suspension control arm further includes a third arm component formed from sheet metal comprising an outer wall and two side walls, two ends, each end comprising at least one third arm component rivet aperture, a ride bushing seat component and a handling bushing seat component, wherein the third arm component is adapted to be riveted to each of the first arm component and the second arm component adjacent the first ends thereof and to both the ride bushing seat component and the handling bushing seat component adjacent the respective ends of the third arm component.

In a further aspect of the invention, a vehicular suspension control arm comprises a first arm component and a second arm component formed from sheet metal, each arm component comprising an outer wall and two side walls, an integral bushing seat receiving aperture adjacent a first end, at least one bracket receiving rivet aperture adjacent a second end, at least one component connecting rivet aperture located between the first end and the second end, a rod comprising a ride bushing seat at a first end, a handling bushing seat at a second end, and first and second contacting surfaces located interiorly of the seats and along the rod adjacent the seats adapted to contact the first and second arm components when the respective seats extend through the seat receiving apertures, a ball joint bracket comprising bracket rivet apertures corresponding to the bracket receiving rivet apertures adjacent the second ends of the first and second arm components, and a plurality of rivets, such that when constructed, the ride bushing seat extends through the seat receiving aperture of the first component, the handling bushing seat extends through the seat receiving aperture of the second component, the first and second arm components contact the first and second contacting surfaces of the rod, the ball joint bracket is riveted to both the first and second arm components adjacent the second ends thereof via the bracket receiving rivet apertures and the corresponding bracket rivet apertures, and the first arm component is riveted to the second arm component at the corresponding at least one arm component connecting rivet aperture.

In a further aspect of the invention, the side walls of the first and second arm components partially overlap and remain spaced apart at the first ends thereof.

In a further aspect of the invention, at least one spacer maintains a spacing between the side walls of both the first and second arm components at the at least one arm component rivet apertures.

In a further aspect of the invention, the first and second arm components are riveted at three arm component rivet apertures.

In a further aspect of the invention, one of the three arm component rivet apertures is located adjacent the second end of the arm components, and the ball joint bracket is riveted to each of the first and second arm components at said rivet apertures.

In a further aspect of the invention, the bushing connecting means comprises an integral bushing stud receiving aperture adjacent the first end of each of the first arm component and the second arm component, and wherein the control arm further comprises a rod comprising a ride bushing stud at a first rod end, a handling bushing stud at a second rod end, and first and second seating surfaces located interiorly along the rod adjacent the studs adapted to contact the first and second arm components when the respective studs extend through the bushing stud receiving apertures, such that when constructed, the ride bushing stud extends through the bushing stud receiving aperture of the first arm component, the handling bushing stud extends through the bushing stud receiving aperture of the second arm component, and the first and second arm components respectively contact the first and second seating surfaces of the rod.

In a further aspect of the invention, the rod is tubular.

In a further of the invention, the ride bushing comprises a bracket which is riveted to the first end of the first arm component.

In a further aspect of the invention, the handling bushing is stabilized by contact with a reinforcement sheet metal stamping riveted to at least one of the first and second arm components adjacent the first end of the second arm component.

In a further aspect of the invention, the second bushing stud is interiorly threaded to accept a correspondingly exteriorly threaded fastener and comprises the exterior handling bushing seat, an exterior second contacting surface formed as a shoulder on the second bushing stud and a tapered portion, and the control arm further comprises a shaped ring which fits over and onto the second bushing stud and sits on the tapered portion to hold the second arm component against the second contacting surface when the handling bushing is fastened to the second bushing stud.

DETAILED DESCRIPTION

Figure 1:
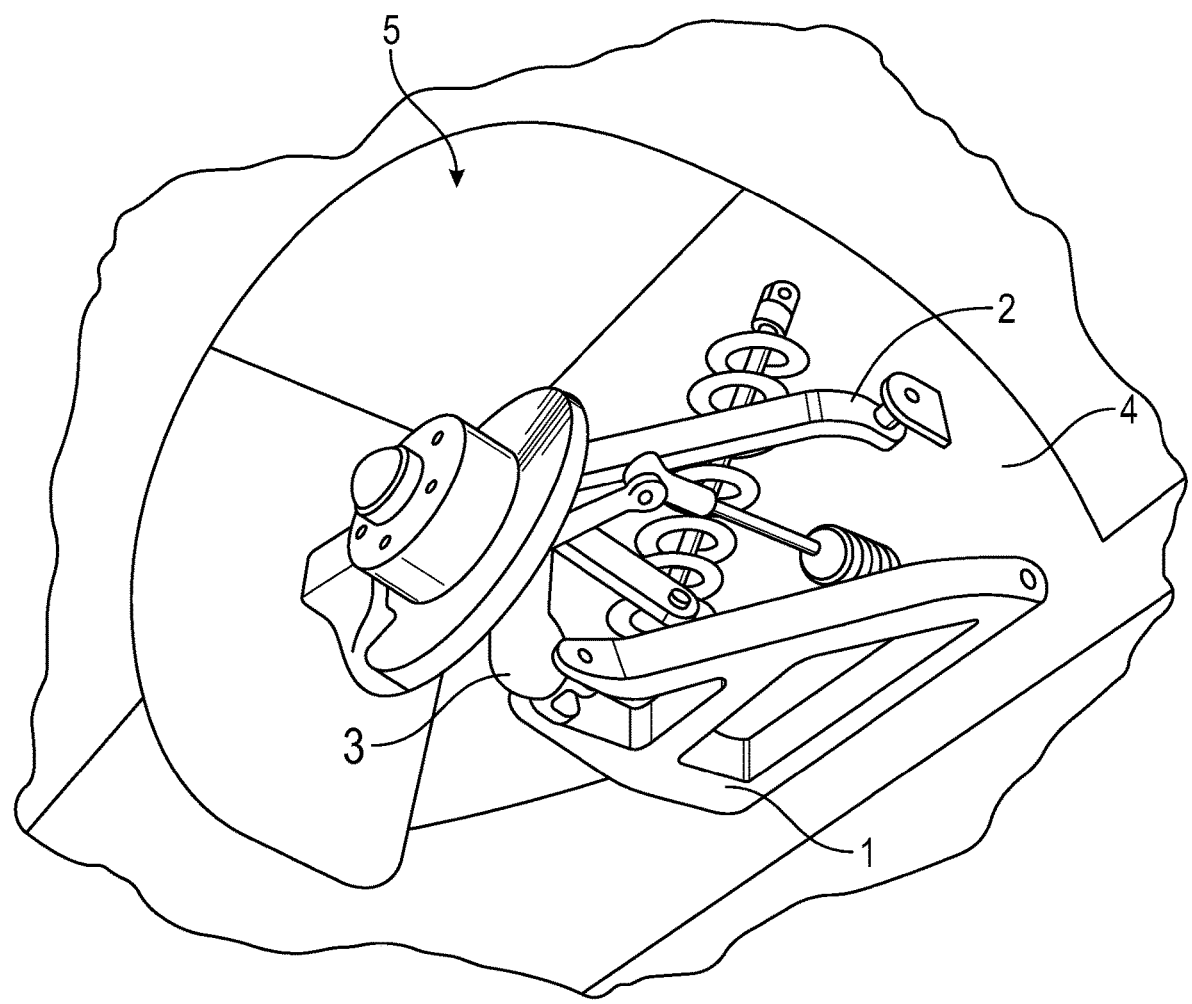
FIG. 1 is a perspective view of a prior art four bar link vehicle suspension system.
Figure 2:
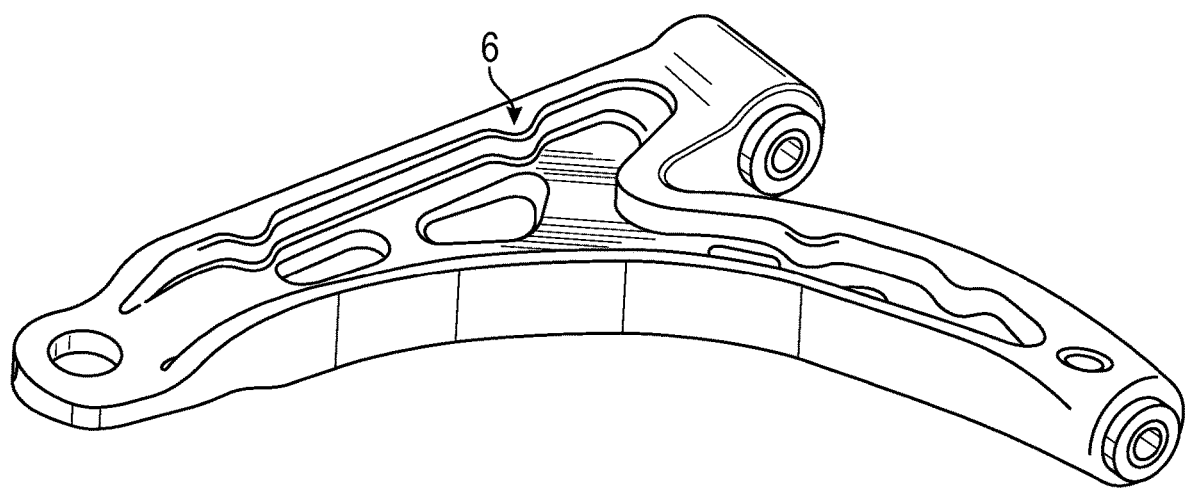
FIG. 2 is a perspective view of a prior art cast or forged suspension control arm.
Figure 3:
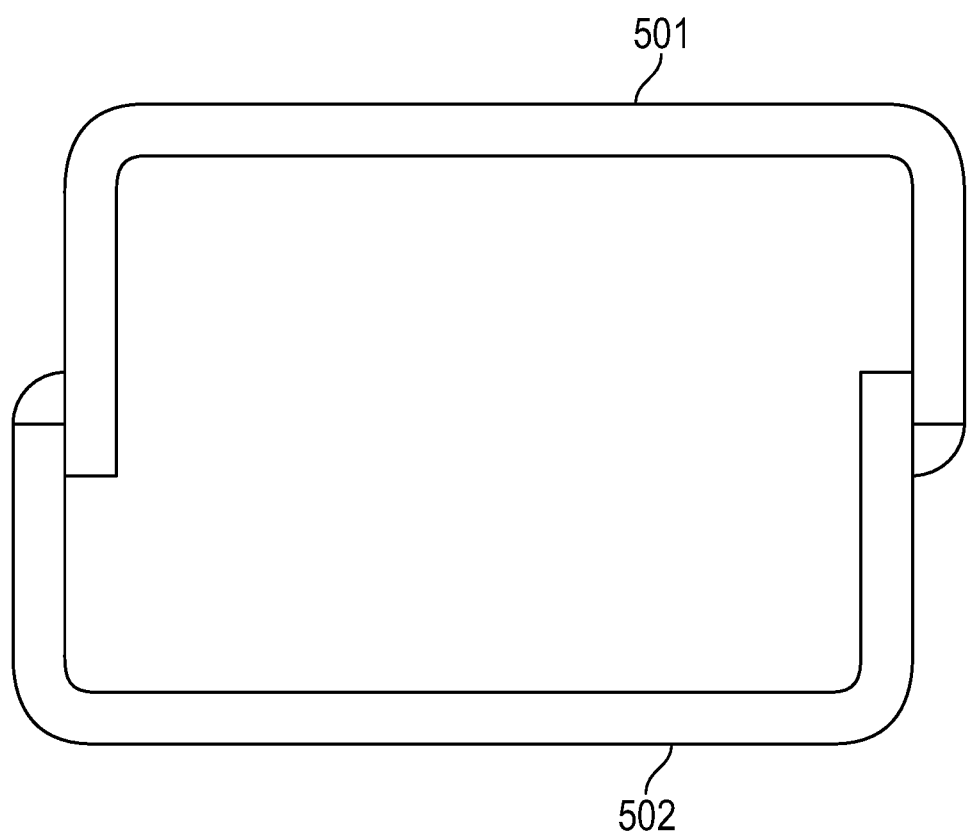
FIG. 3 is a cross-sectional elevation view of a typical prior art welded suspension control arm constructed from two U-shaped press-formed metal stampings.
Figure 4:
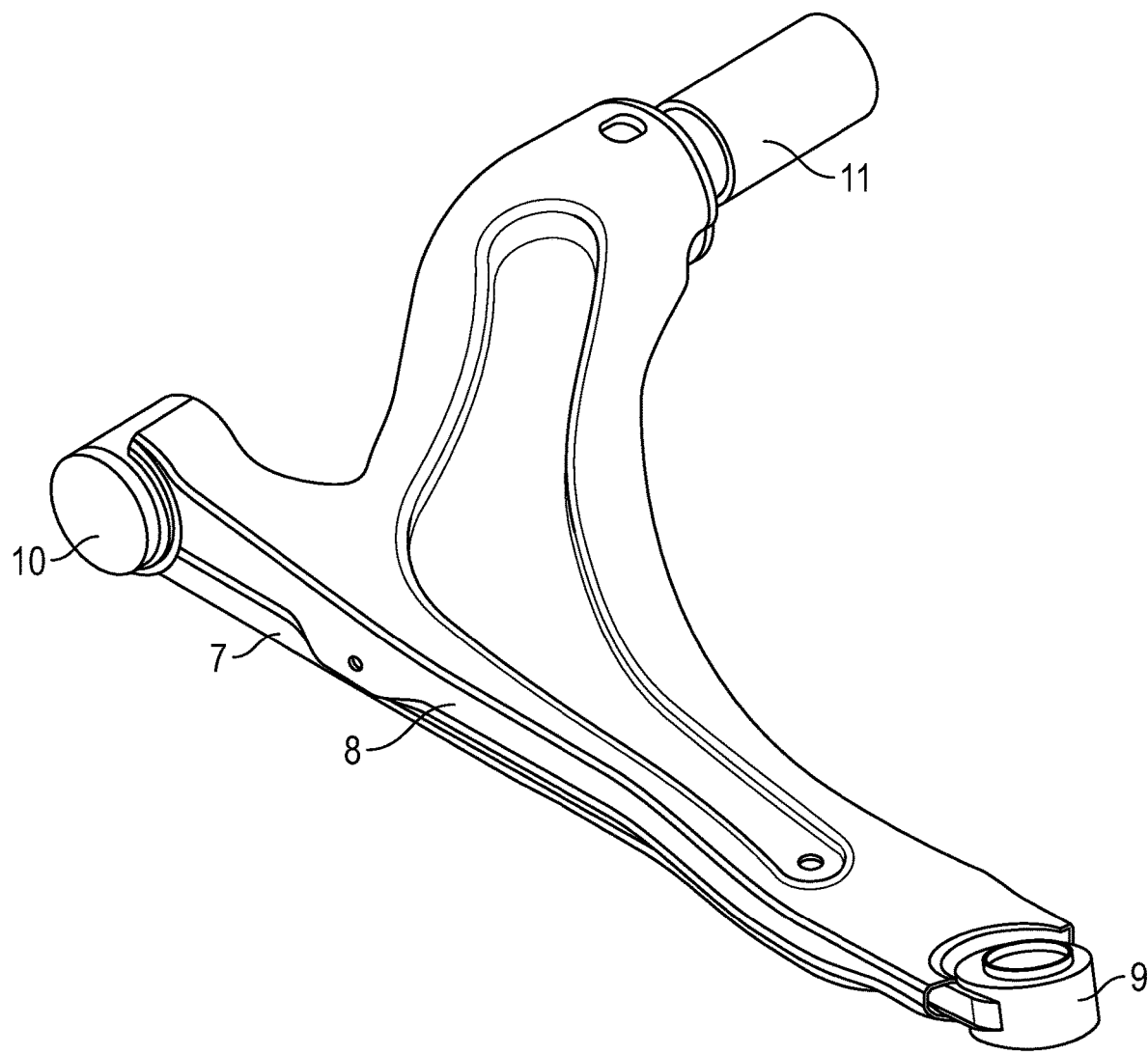
FIG. 4 is a perspective view of a typical prior art welded suspension control arm constructed from two U-shaped press formed metal stampings.

FIGS. 5 to 9 illustrate a preferred embodiment of the weldless vehicle suspension control arm 15 of the invention. A first arm component 12 and a second arm component 14 are stamped from sheet metal. The preferred material is a steel sheet pre-coated for corrosion protection. Given the nature of this construction, a lighter gage sheet metal may generally be used than with a corresponding prior art welded construction, such as illustrated in FIG. 3 and FIG. 4.

First arm component 12 and second arm component 14 have certain common features. Each comprises an outer wall 16 and two side walls 18. Each arm component has an integral bushing seat receiving aperture 20 adjacent a first end 22 of the arm component. With appropriate stamping, the apertures 20 are formed from the same material comprising the rest of the arm component without the need to weld or otherwise attach a separate component with a bushing seat to the control arm, as typical in prior art manufacture. In addition, each arm component 12, 14 comprises at least one bracket receiving rivet aperture 24 adjacent a second end 26 of the arm component. In the preferred embodiment of FIG. 5, two aligned bracket receiving apertures 24 are formed during stamping in each arm component. In addition, each arm component comprises at least one component connecting rivet aperture 28 located between the first end 22 and the second end 26. In the preferred embodiment of FIG. 5, each arm component 12, 14 comprises three pairs of aligned component connecting rivet apertures 28.

A rod 30 serves to provide a non-riveted connection between the arm components 12, 14. It also replaces separate components, such as bushing seats, which would otherwise have to be welded or similarly attached to the control arm, as further discussed below. The rod 30 is preferably tubular to decrease the weight of the control arm, although it may be solid. The rod 30 comprises a first stud 31 with a ride bushing seat 32 at a first end 34 and a second stud 33 with a handling bushing seat 36 at a second end 38. These bushing seats 32, 36 are intended to accept bushings, as further discussed below. The rod 30 also comprises a first contacting surface 40 and a second contacting surface 42 located interiorly from the first and second ends 34, 38 of the rod. These contacting surfaces 40, 42 are designed to contact the first and second arm components 12, 14 at the bushing seat receiving apertures 20 when the control arm is assembled.

A ball joint bracket 44 is adapted to receive a ball joint, as further discussed below. The ball joint bracket 44 comprises bracket rivet apertures 46 corresponding to the bracket receiving apertures 24 adjacent the second ends 26 of the first and second arm components 12, 14. In the preferred embodiment illustrated in FIG. 5, two exterior bracket rivet apertures 46 align respectively with a pair of bracket receiving rivet apertures 24 on each of the first and second arm components 12, 14. An interior bracket rivet aperture 46 aligns with the pairs of component connecting apertures 28 adjacent the second end 26 of the arm components 12, 14. Thus, the pairs of component connecting apertures 28 adjacent the second end 26 of the arm components 12, 14 serve both in the connection of the two arm components to each other and in the connection of the ball joint bracket 44 to the two arm components.

Figure 6:
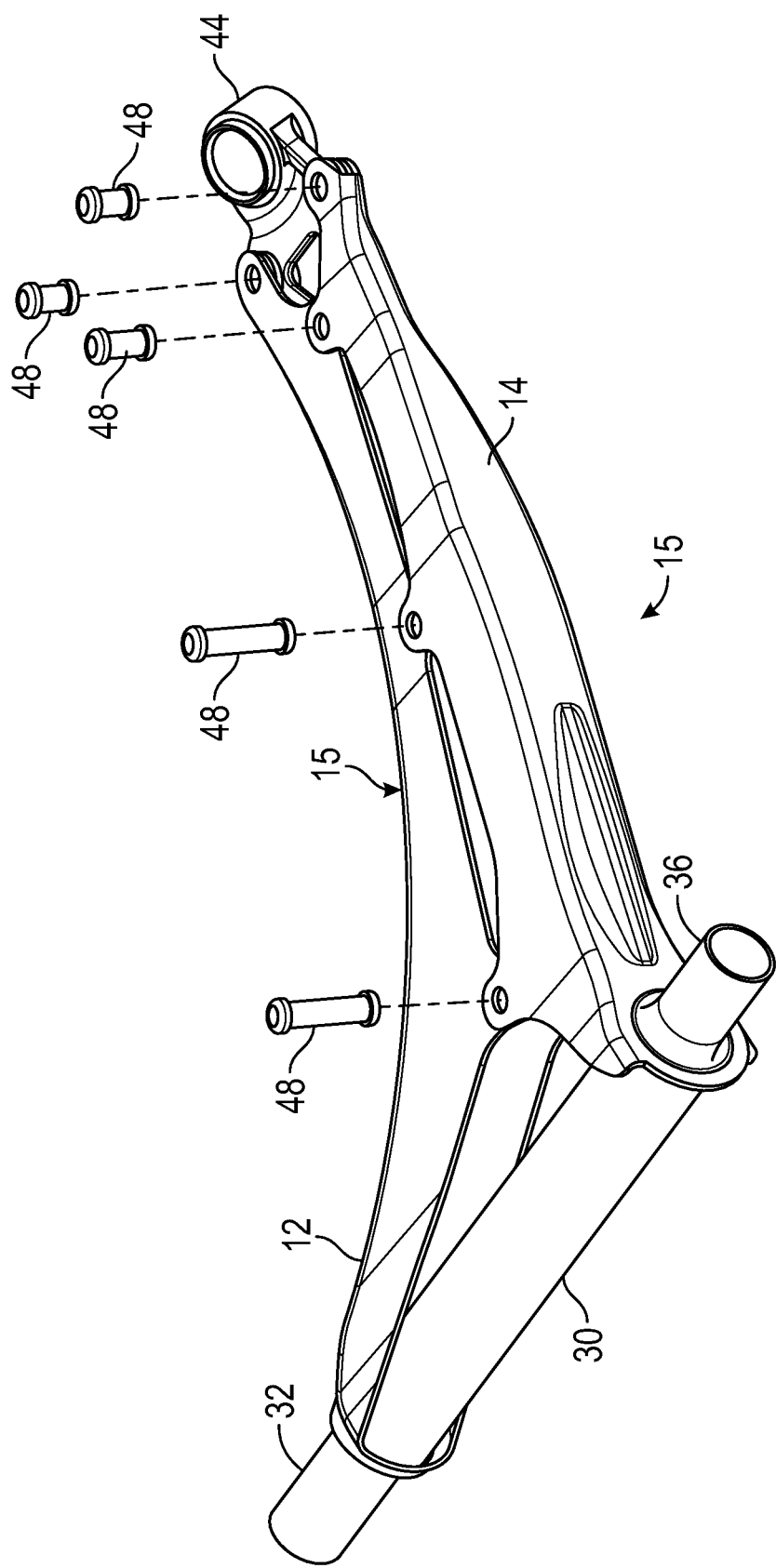
FIG. 6 is a perspective partially exploded and partially assembled view of the non-welded suspension control arm of the invention.

A plurality of rivets 48, as illustrated in FIG. 6, are employed to join the various components at the various bracket receiving rivet apertures 24, component connecting rivet apertures 28 and bracket rivet apertures 46.

Figure 5:
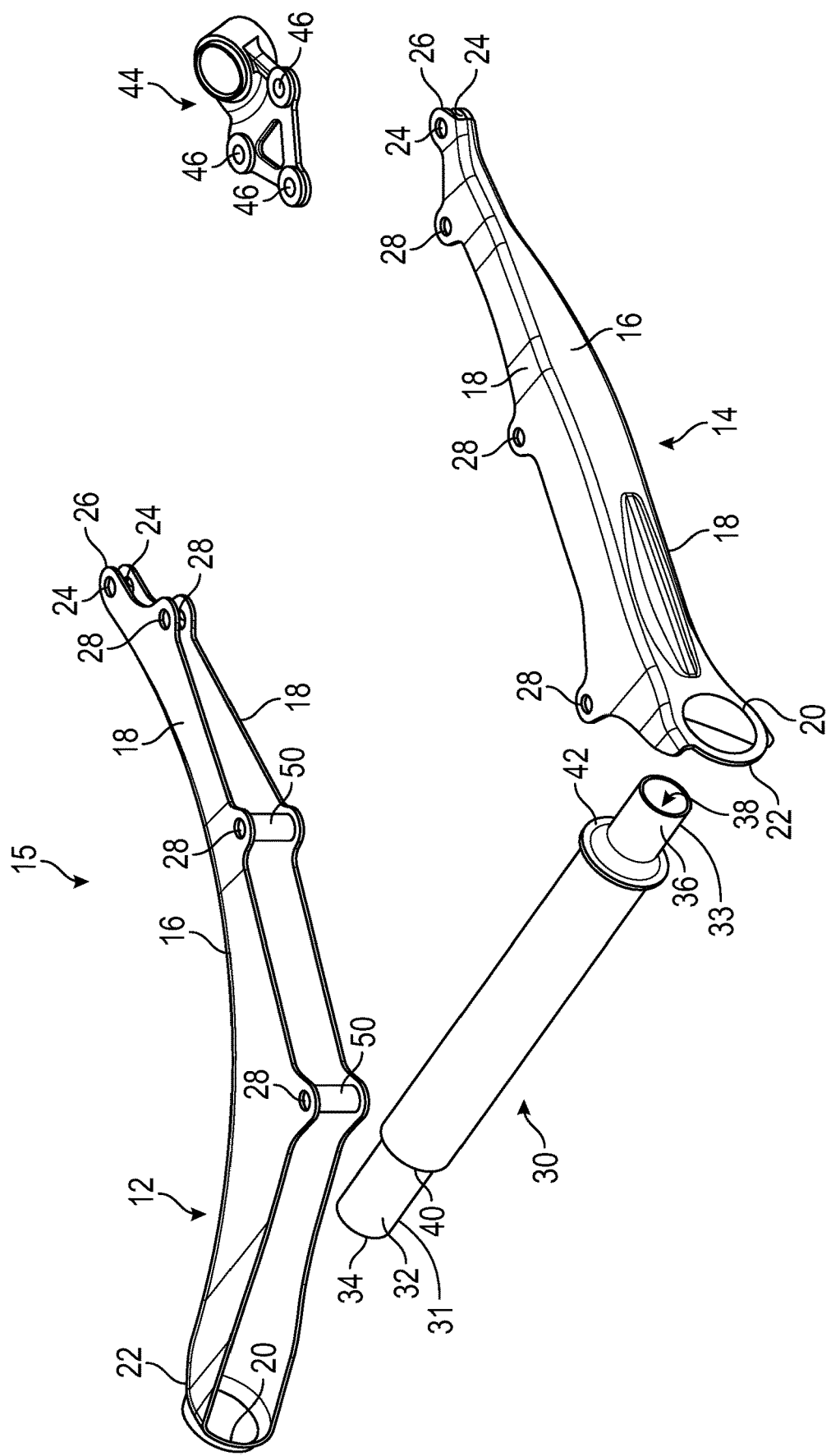
FIG. 5 is a perspective explosion view of components of a principal embodiment of the non-welded suspension control arm of the invention.

Spacers 50 may be used to maintain the stability of the arm components 12, 14 prior to and during assembly. As illustrated in FIG. 5, the spacers 50 are located at component connecting rivet apertures 28 in the first arm component 12 prior to assembly, although either arm component could receive them. The spacers 50 maintain the spacing between the side walls 18 of each of the arm components when the control arm is assembled.

Figure 7:
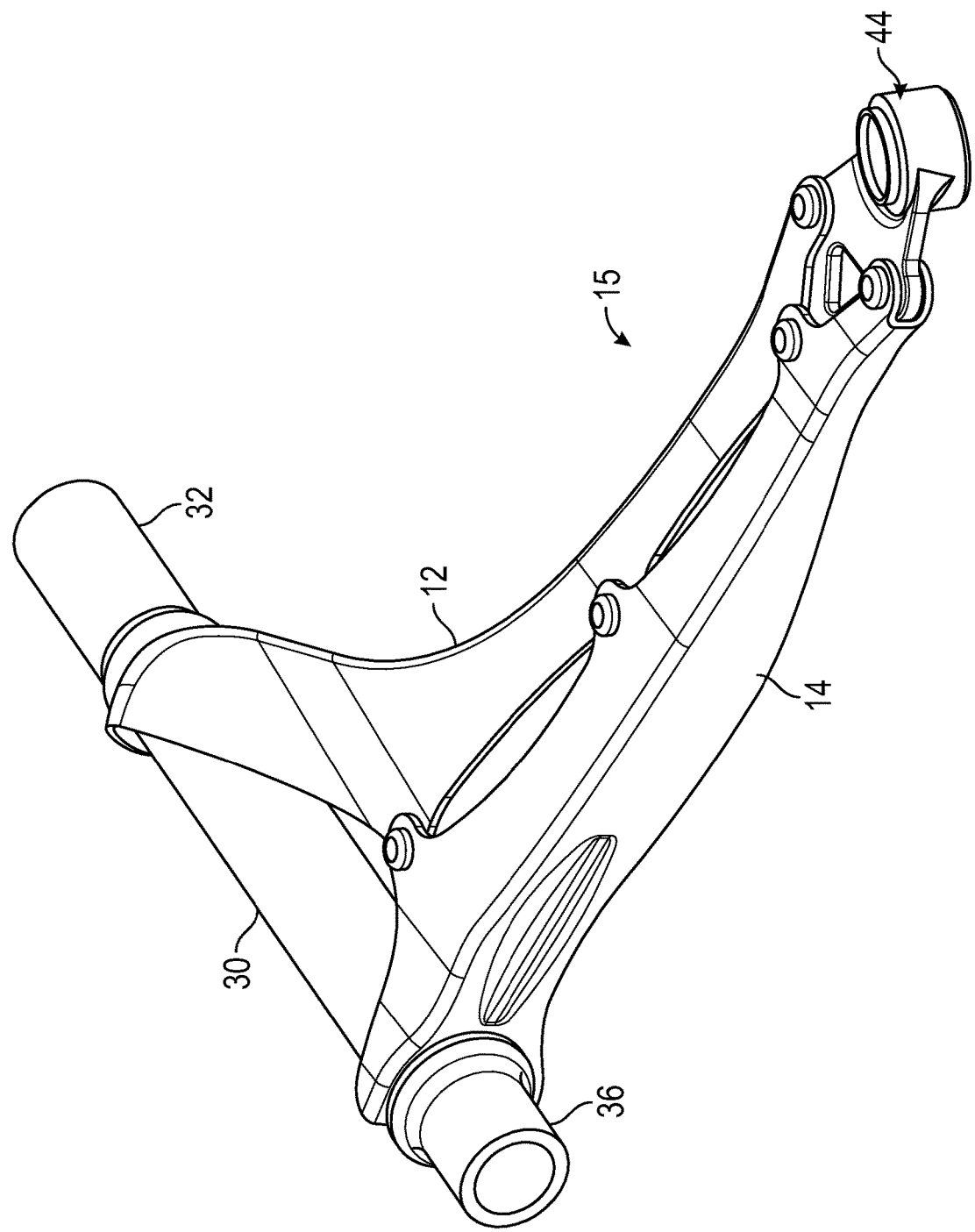
FIG. 7 is a perspective view of the partially assembled non-welded suspension control arm of FIG. 5.
Figure 8:
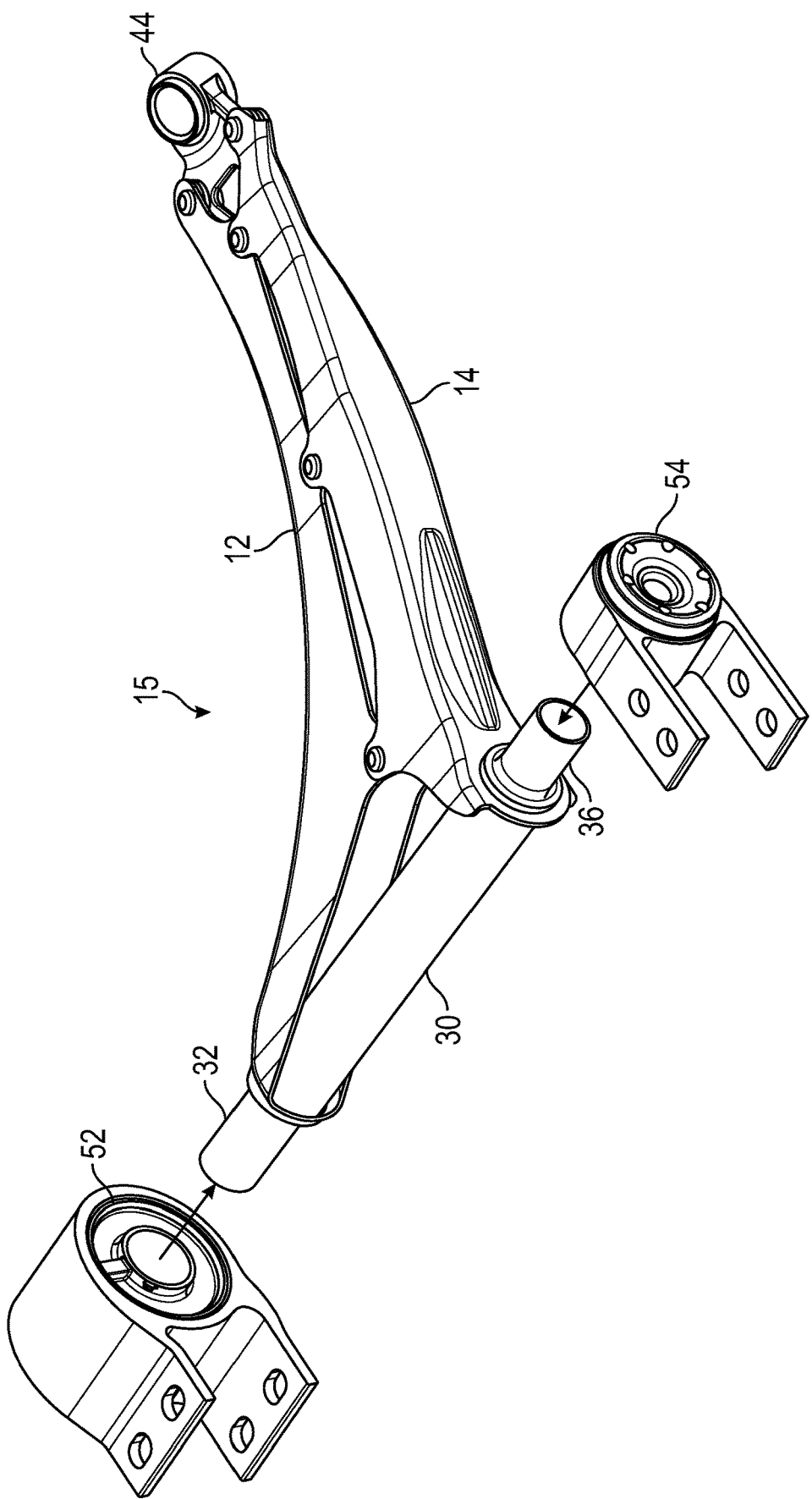
FIG. 8 is a perspective view of the non-welded suspension control arm of FIG. 7 with bushings shown pre-assembly to the control arm.

In a preferred assembly sequence, following stamping of the first and second arm components 12, 14, the spacers 50 are installed in alignment with the centrally located component connecting rivet apertures 28 in the first arm component 12 which typically will face rearward in relation to the vehicle. The following sequence may occur simultaneously or in close sequence. The ride bushing seat 32 of the stud 31 of rod 30 is inserted through the bushing seat receiving aperture 20 of the first component 12 and the first contacting surface 40 of the rod 30 contacts the first arm component 12. The handling bushing seat 36 of the stud 33 is inserted through the bushing seat aperture 20 of the second component 14 and the second contacting surface 42 contacts the second arm component 14. The first and second arm components 12, 14 are brought into overlapping alignment at the component connecting rivet apertures 28. The ball joint bracket 44 is brought into alignment with the first and second arm components 12, 14 at the bracket receiving rivet apertures 24, the bracket rivet apertures 46 and the component connecting rivet apertures 28 adjacent the second end 26 of the arm components. FIG. 6 illustrates the partially assembled control arm at this point. The rivets 48 are then installed to complete the basic control arm 15, as illustrated in FIG. 7. An advantage of the structure of the preferred embodiment illustrated is that the rivets 48 may be installed in a single plane, thus simplifying the assembly significantly. A further fitting or fittings (not illustrated) may be employed to secure the rod 30 to the assembled control arm 15.

Figure 9:
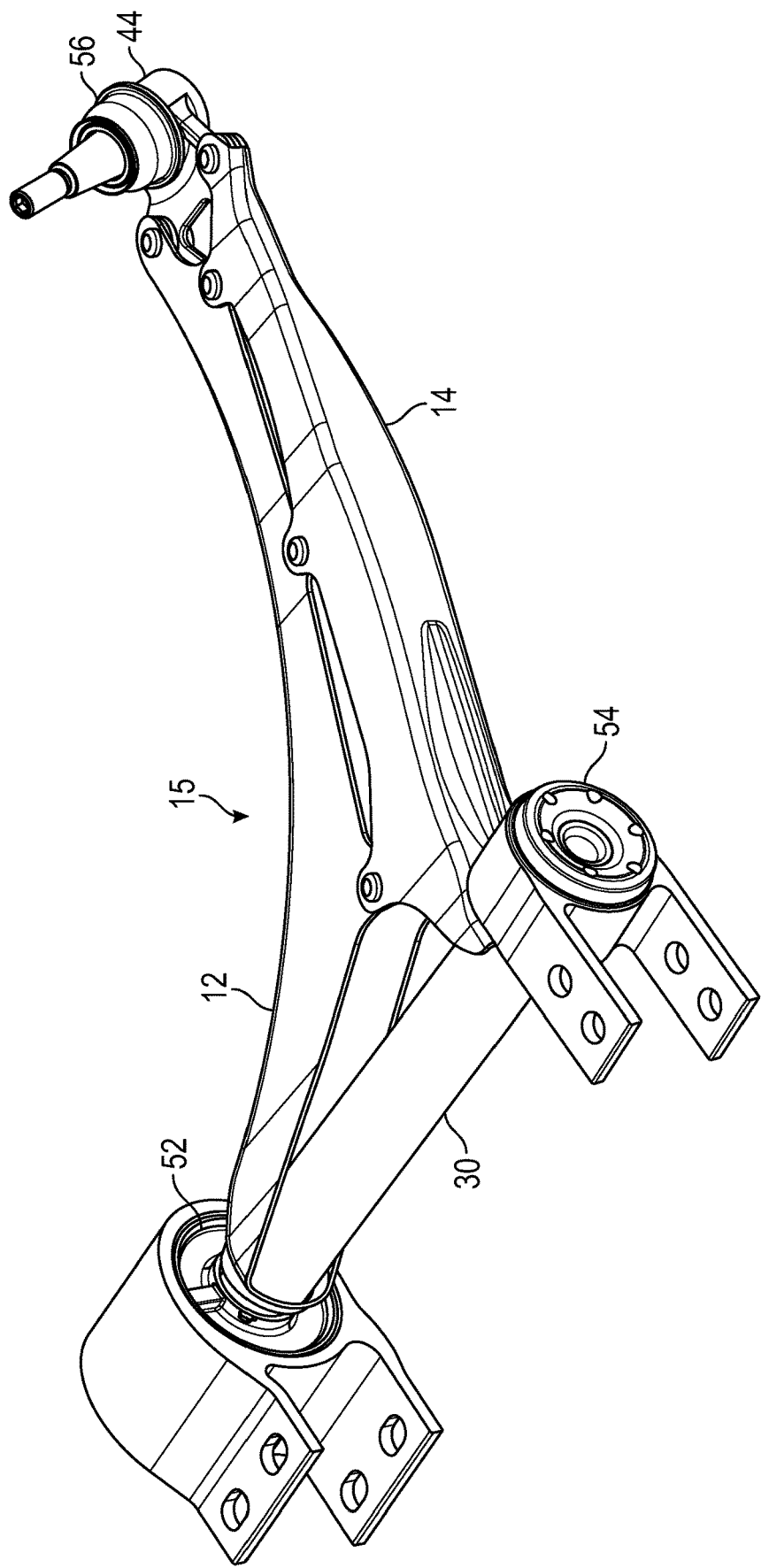
FIG. 9 is a perspective view of the non-welded suspension control arm of FIG. 8 with bushings and ball joint assembled.

Following construction of the basic control arm 15, the ride bushing 52 may be installed on the ride bushing seat 32 and the handling bushing 54 may be installed on the handling bushing seat 36. Installation may be by press fitting the bushings 52, 54 onto the bushing seats 32, 36. This is shown pre-assembly of the bushings in FIG. 8. A ball joint 56 may also be connected to the control arm 15 at the ball joint bracket 44 using standard methods. The fully assembled control arm including the bushings 52, 54 and the ball joint 56 is illustrated in FIG. 9. Clearly, other known methods may be employed as appropriate to assemble the control arm, bushings and ball joint.

Figure 10:
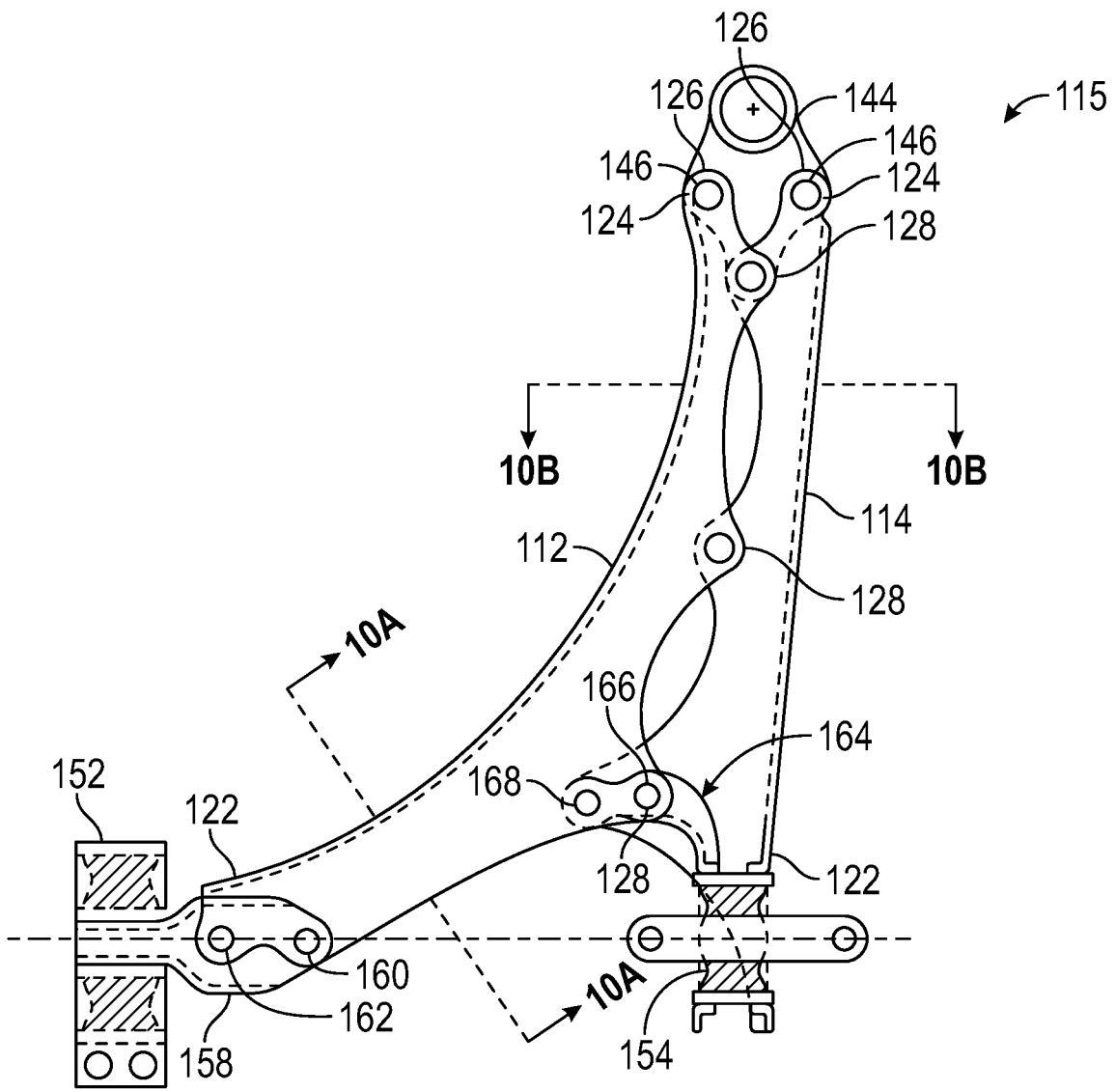
FIG. 10 is a plan view of an alternative principal embodiment of the non-welded suspension control arm of the invention.
Figure 10A:
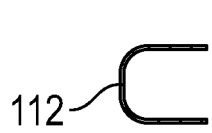
FIG. 10A is a cross-sectional view taken along line 10A-10A in FIG. 10.

A second principal embodiment of the control arm structure is illustrated in FIG. 10. In this case, the rod 30 is eliminated. Again, a plurality of rivets is employed to join the various components. This embodiment may be beneficial in particular applications, such as where the "packaging" requirements of the control arm within the suspension system dictate a different perimeter profile for the control arm. Elimination of the rod 30 may also lead to reduced mass and cost of the part, which is generally desirable as long as sufficient part durability and functionality are maintained.

Figure 10B:
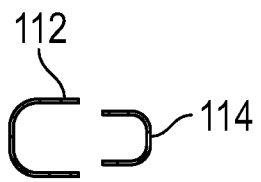
FIG. 10B is a cross-sectional view taken along line 10B-10B in FIG. 10.
Figure 11A:
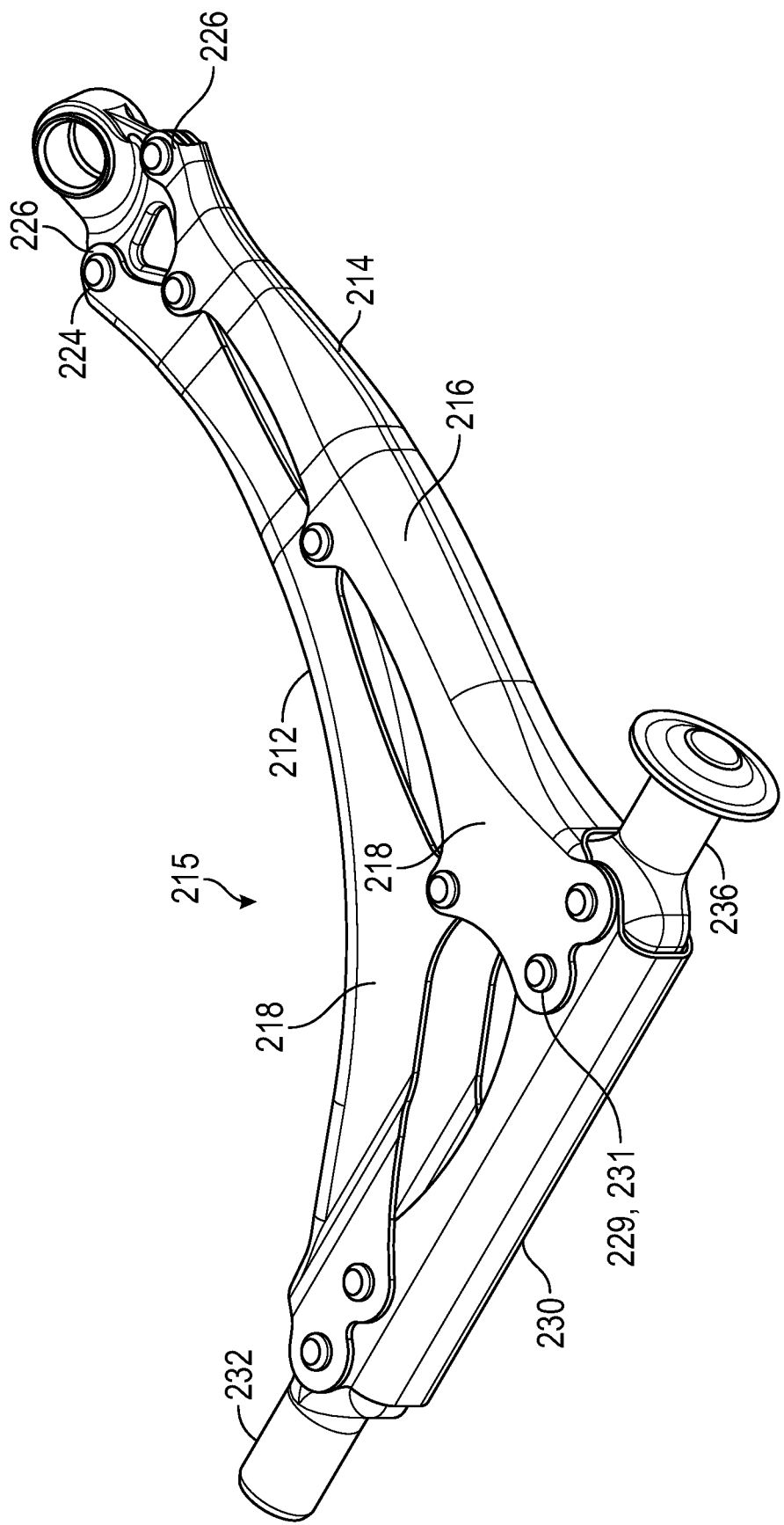
FIG. 11A is a perspective view of a further alternative embodiment of the non-welded suspension control arm of the invention.
Figure 11B:
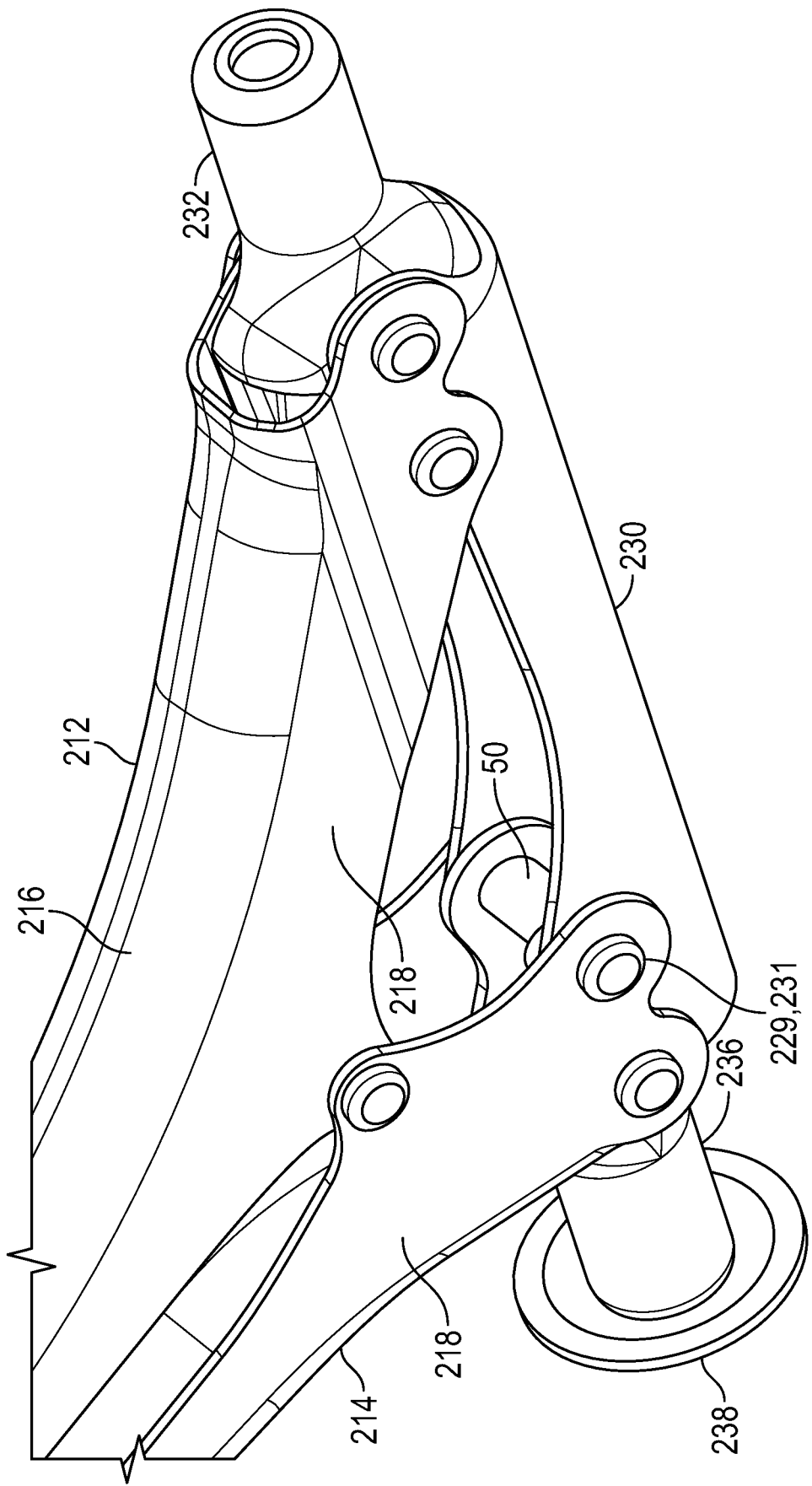
FIG. 11B is a perspective view of a portion of the non-welded suspension control arm of FIG. 11A.
Figure 11C:
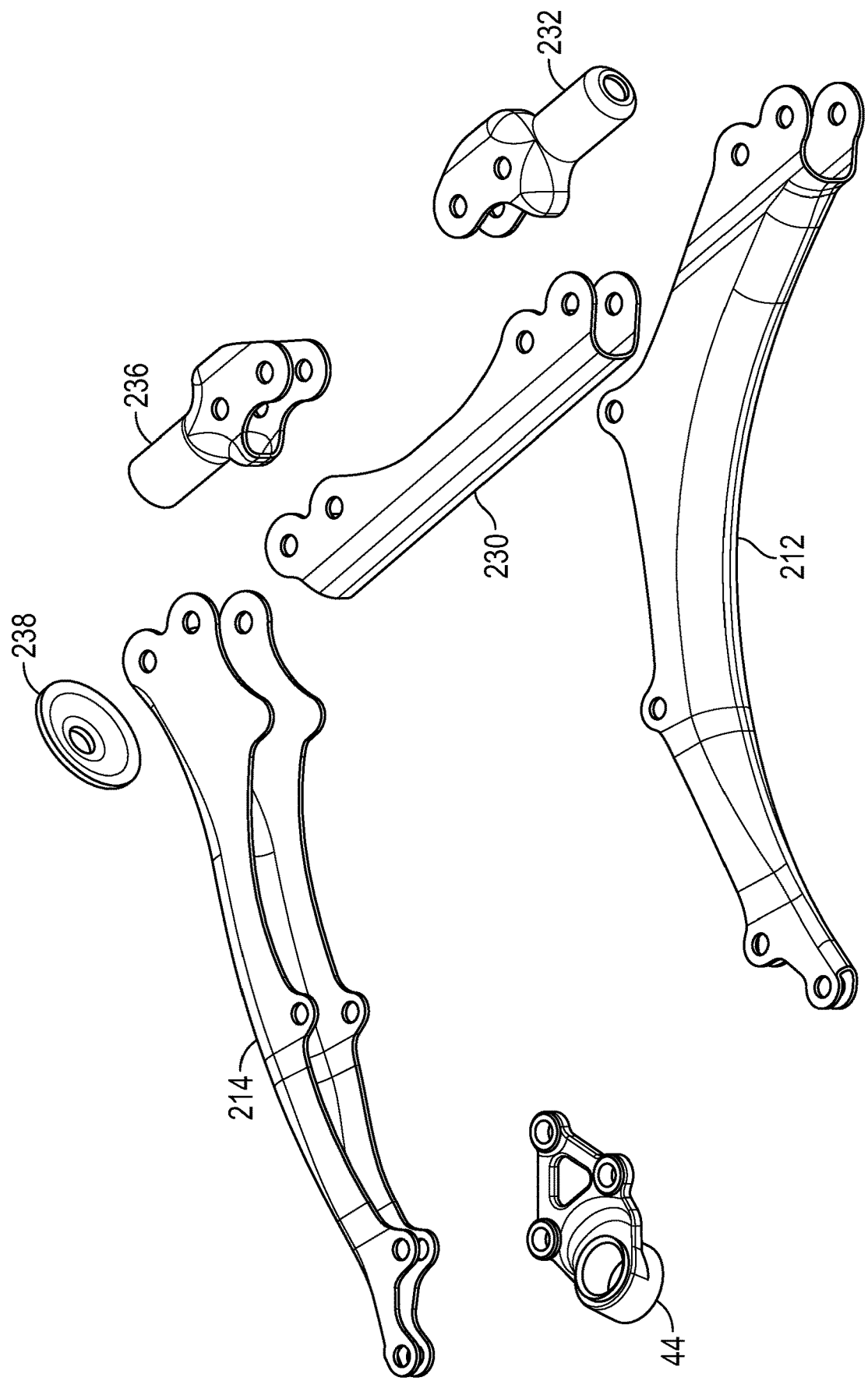
FIG. 11C is a perspective exploded view of certain components of the control arm of FIG. 11A.

Referring to FIG. 10-10B, the control arm 115 is constructed with first arm component 112 and second arm component 114. These components are also illustrated schematically in cross-section to show the typical U-shape of the arm components with an outer wall and two side walls. The side walls of the second arm component 114 are spaced closer to each other than the side walls of the first wall component 112 to allow the second arm component 114 to nest partially within the first arm component 112. A ball joint bracket 144 is adapted to receive a ball joint.

The ball joint bracket 144 comprises bracket rivet apertures 146 corresponding to the bracket receiving apertures 124 adjacent the second ends 126 of the first and second arm components 112, 114. Two exterior bracket rivet apertures 146 align respectively with a pair of bracket receiving apertures 124 on each end of the first and second arm components 112, 114, although other attachment choices could be made. Thus, the pairs of component connecting apertures 128 adjacent the second end 126 of the arm components serve both in the connection of the two arm components to each other and in the connection of the ball joint bracket 144 to the two arm components.

The ride bushing 152 comprising ride bushing bracket 158 is riveted to the first end 122 of the first component 112 at one or more bushing bracket apertures 160 and one or more first arm component bushing bracket receiving apertures 162. Handling bushing 154 may be conventionally fastened to the first end 122 of the second arm component 114. A reinforcement sheet metal stamping 164 may be riveted to the first and second component at one or more apertures 166, 168. The reinforcement sheet metal stamping 164 contacts the handling bushing 154 and serves to stabilize it. Of course, the reinforcement may be made by other than sheet metal stamping, but using a sheet metal stamping is consistent with the processes to create the control arm as a whole and will have benefits attendant to those processes.

A further principal embodiment of the invention is illustrated in FIGS. 11A to 13. This embodiment is similar to the construction of the control arm illustrated in FIGS. 5 to 9, except that the rod joining the first and second arm components is replaced with a third arm component comprising a sheet metal stamping shaped similarly to the first and second arm components in terms of its outer wall and two side walls. Instead of forming bushing seat apertures from the sheet metal material of the first arm component and second arm component, separate bushing seat components are riveted to the first ends of the first and second arm components along with the third arm component to form a robust riveted structure ready to receive bushings. The bushing seat components may be formed from sheet metal or other convenient materials.

In the embodiments of FIGS. 11A to 13, a first arm component 212 and a second arm component 214 are stamped from sheet metal. First arm component 212 and second arm component 214 have certain common features. Each arm component 212, 214 comprises an outer wall 216 and two side walls 218. In addition, each arm component 212, 214 comprises at least one bracket receiving rivet aperture 224 adjacent a second end 226 of the arm component. The arm components 212, 214 are connected both at their second ends and centrally as in the first embodiment already described in relation to the embodiment of FIGS. 5 to 9. The differences between the first embodiment and this further embodiment are manifest at the first ends of the arm components 212, 214. Each arm component 212, 214 comprises at least one additional component connecting rivet aperture 229 located adjacent the first end of the first arm component and the second arm component. In the preferred embodiment of FIGS. 11A to 13, each first and second arm component 212, 214 comprises a pair of additional connecting rivet apertures 229.

Figure 12A:
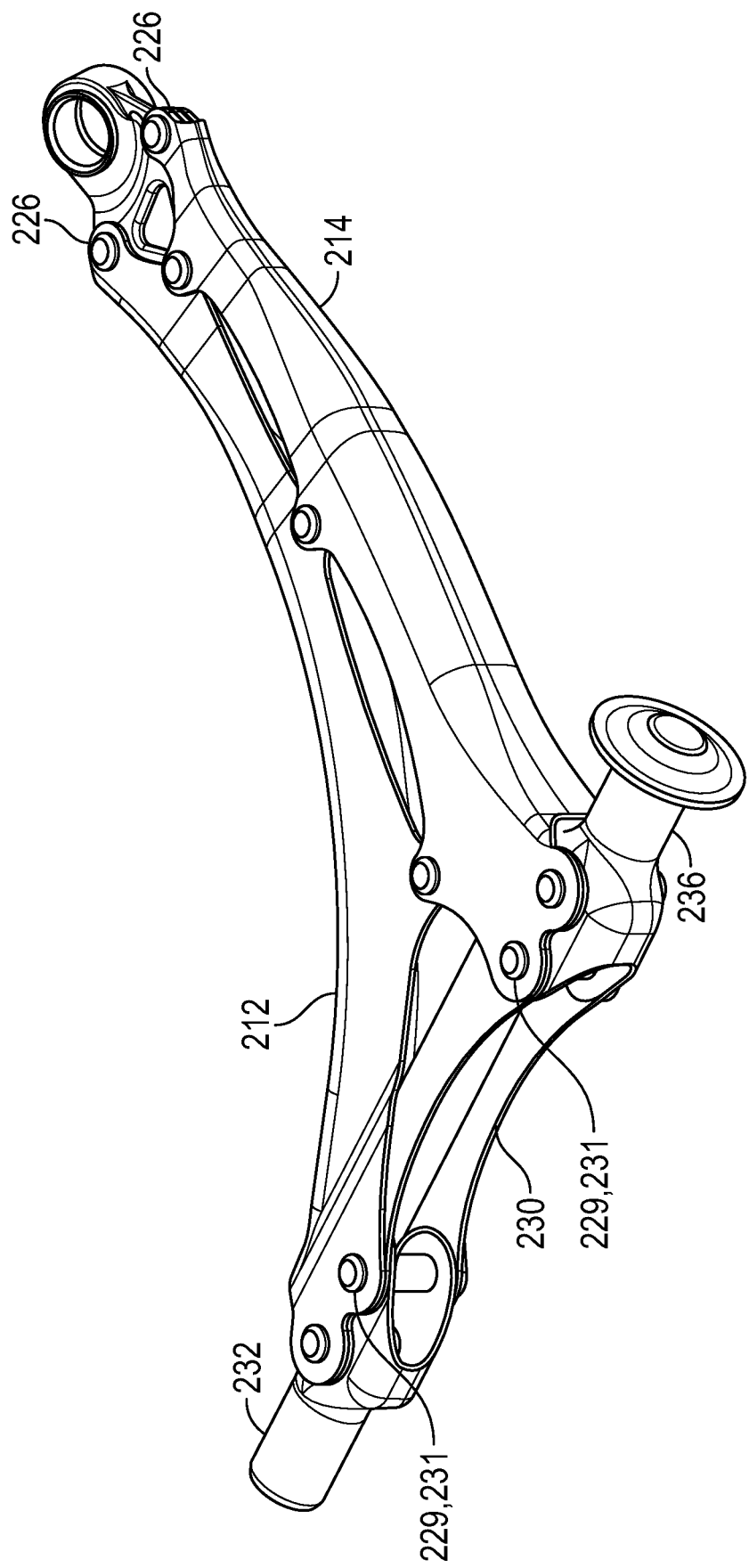
FIG. 12A is a perspective view of the alternative embodiment of FIG. 11A with the orientation of the third arm component reversed.
Figure 12B:
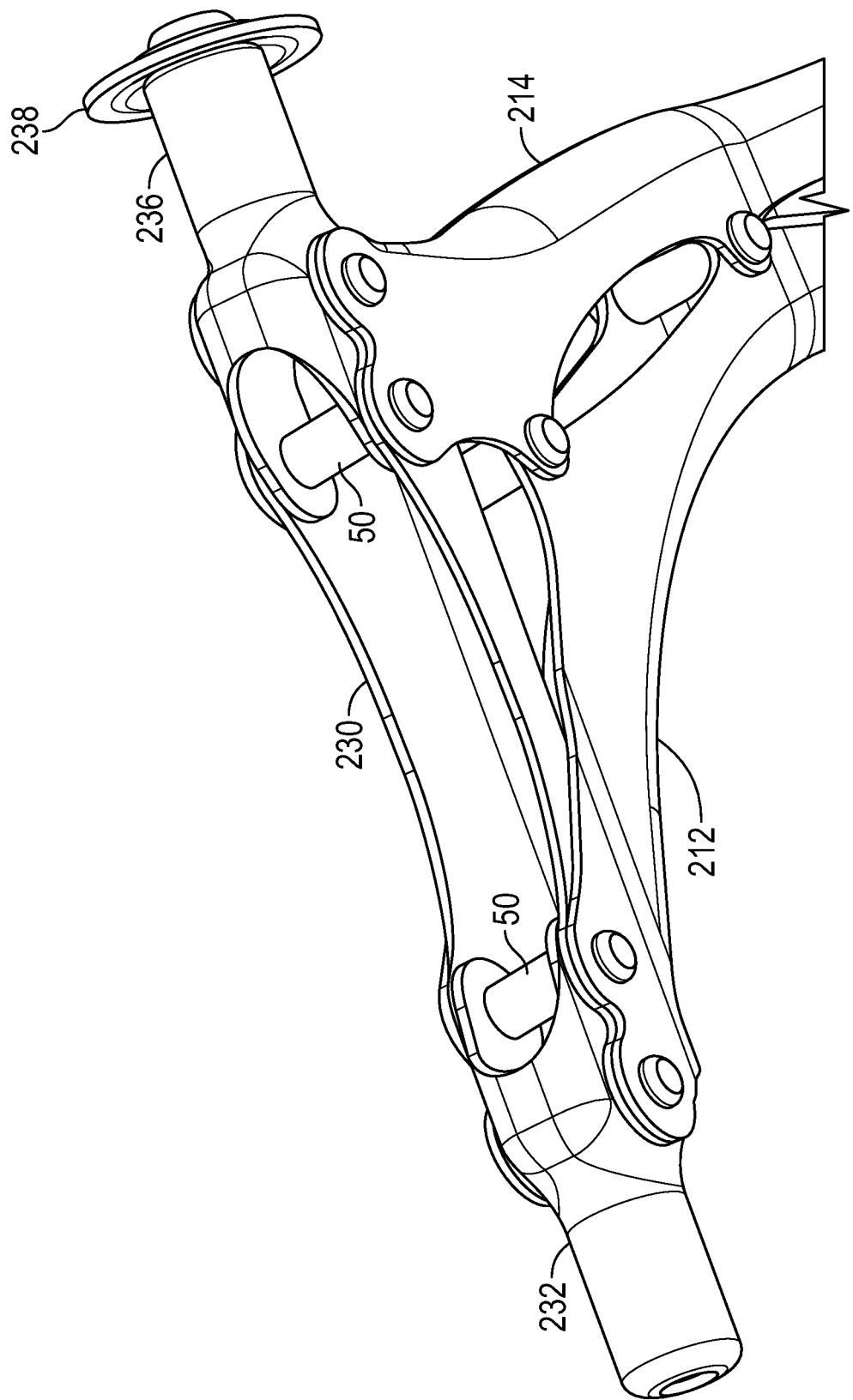
FIG. 12B is a perspective view of a portion of the non-welded suspension control arm of FIG. 12A.

A third arm component 230 serves to provide a riveted connection to the first and second arm components 212, 214. Like the first and second arm components, the third arm component is constructed with an outer wall and two side walls. The third arm component 230 comprises at least one third arm rivet aperture 231 adjacent each end thereof to align with the at least one additional component connecting rivet apertures 229 of the first and second arm components 212, 214. As illustrated in FIGS. 12A and 12B, the third arm component 230 may be oriented in the reverse direction from that in the embodiment illustrated in FIGS. 11A and 11B. When riveted at these apertures, the first and second arm components 212, 214, the third arm component 230 and the ride and handling bushing seat components 232, 236 are all securely connected. Cap 238 serves to hold the handling bushing to the handling bushing seat 236 when secured with a fastener. Spacers 50 may again be employed between the side walls of one of the first and second arm components 212, 214, and between the side walls of the third arm component 230 at the location of the various rivet apertures, to maintain the spacing between the arm components and to support the structure of the control arm.

Figure 13:
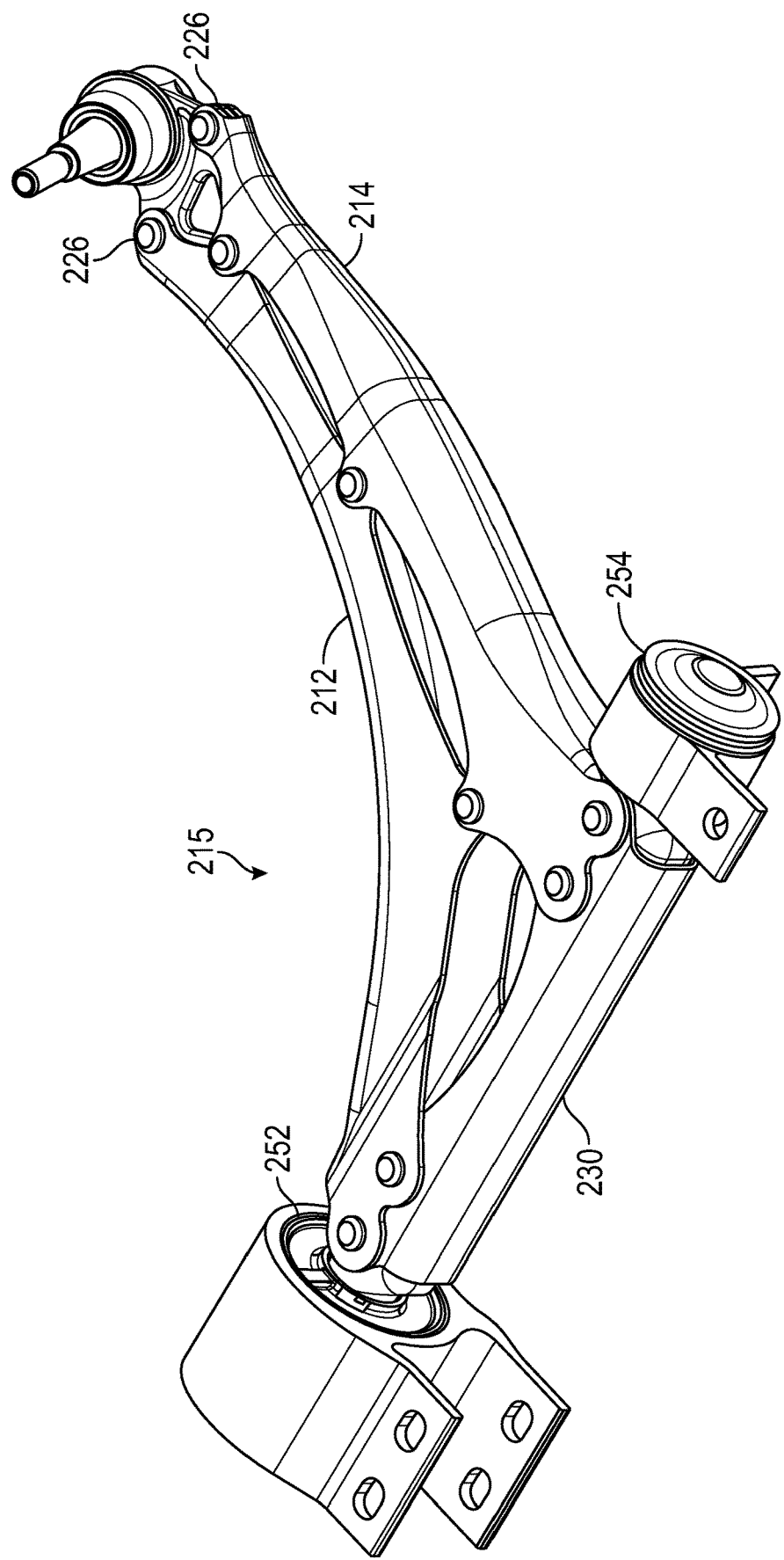
FIG. 13 is a perspective view of the control arm of FIG. 11A with assembled bushings and ball joint.

As shown in FIG. 13, as with the embodiment illustrated in FIGS. 5 to 9, following construction of the basic control arm 215, the ride bushing 252 may be installed on the ride bushing seat of the ride bushing seat component 232, and the handling bushing 254 may be installed on the handling bushing seat of the handling bushing seat component 236.

It is imperative that an automotive control arm be able effectively to transmit the loads to which it is subjected during operation of the suspension system. One concern with employing relatively light gage sheet metal stampings as structural elements of a control arm is the ability of the sheet metal structure to transmit such suspension loads without loss of strength over time which may result from excessive freedom of movement of the components. Particularly in the case of the first embodiment illustrated in FIGS. 5 to 9, where the arm components themselves are stamped with bushing seat receiving apertures, it is important to ensure that the arm component material surrounding those apertures is sufficiently reinforced. Details of a preferred manner to achieve such reinforcement are illustrated in FIGS. 14 to 16B.

Figure 14:
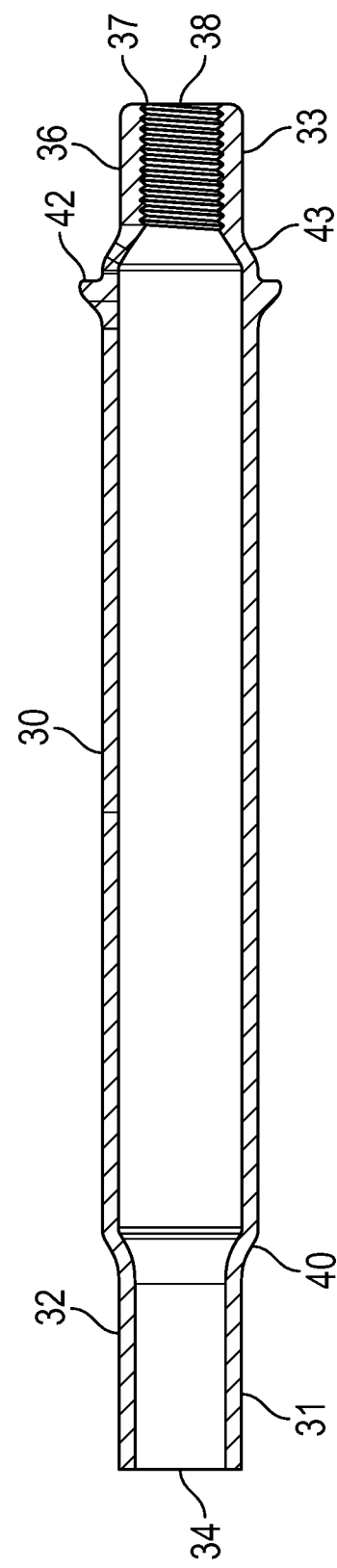
FIG. 14 is an elevational cut-away view of the rod of the first embodiment of FIGS. 5 to 9.

FIG. 14 illustrates a hollow tube rod 30 which has previously been described. At its first end 34, the rod 30 comprises a first bushing stud 31 with a ride bushing seat 32 leading to a tapered portion comprising the first contacting surface 40. At its second end 38, the rod 30 comprises a second bushing stud 33 with a handling bushing seat 36, internal threading 37 in the second stud 33 and a second contacting surface 42 formed as a shoulder on the second stud 33 of the rod 30. A tapered section 43 of the rod 30 lies between the handling bushing seat 36 and the second contacting surface 42.

Figure 15:
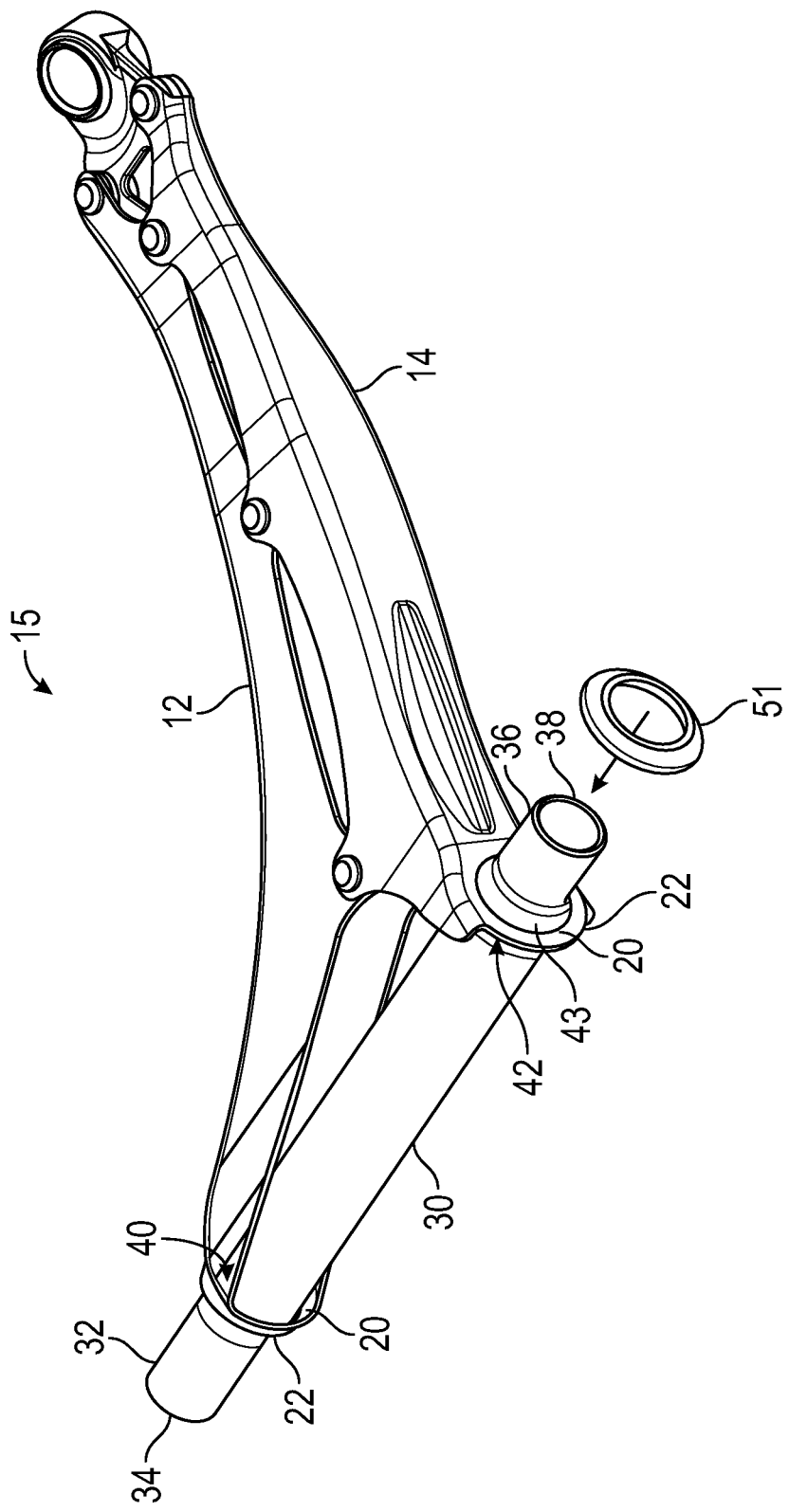
FIG. 15 is a perspective view of the riveted non-welded suspension control arm of FIGS. 5 to 9 showing assembly of a shaped ring.

FIG. 15 illustrates a riveted control arm 15. Adjacent the first end 34 of the rod 30, the first contacting surface 40 abuts the first arm component 12 as the ride bushing seat 32 passes through the bushing seat receiving aperture 20 at the first end 22 of the first arm component 12. Adjacent the second end 38 of the rod 30, the second contacting surface 42 abuts the second arm component 14 as the handling bushing seat 36 passes through the bushing seat receiving aperture 20 at the first end 22 of the second arm component 14.

Figure 16A:
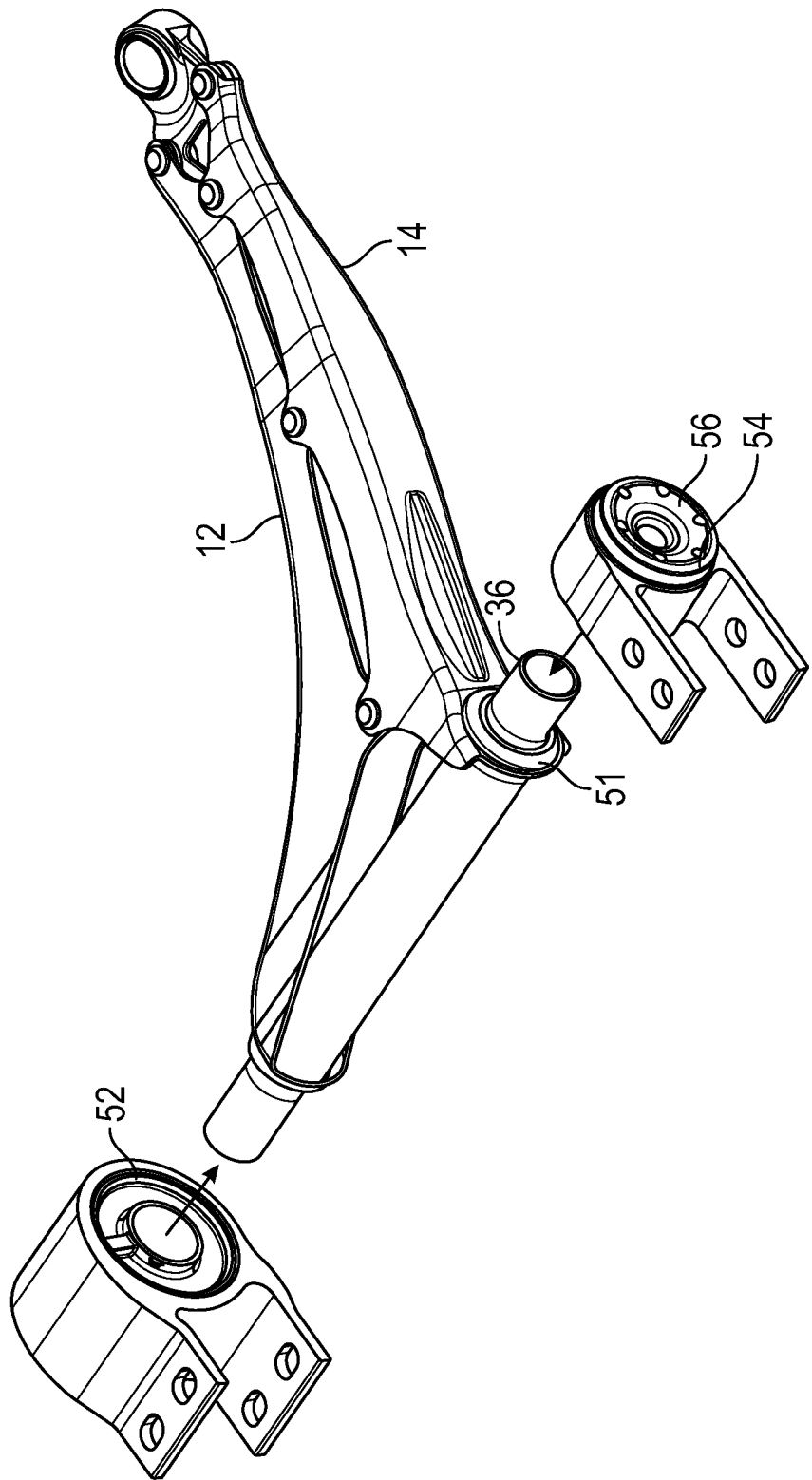
FIG. 16A is a perspective view of the control arm of FIG. 15 ready for assembly of the bushings.
Figure 16B:
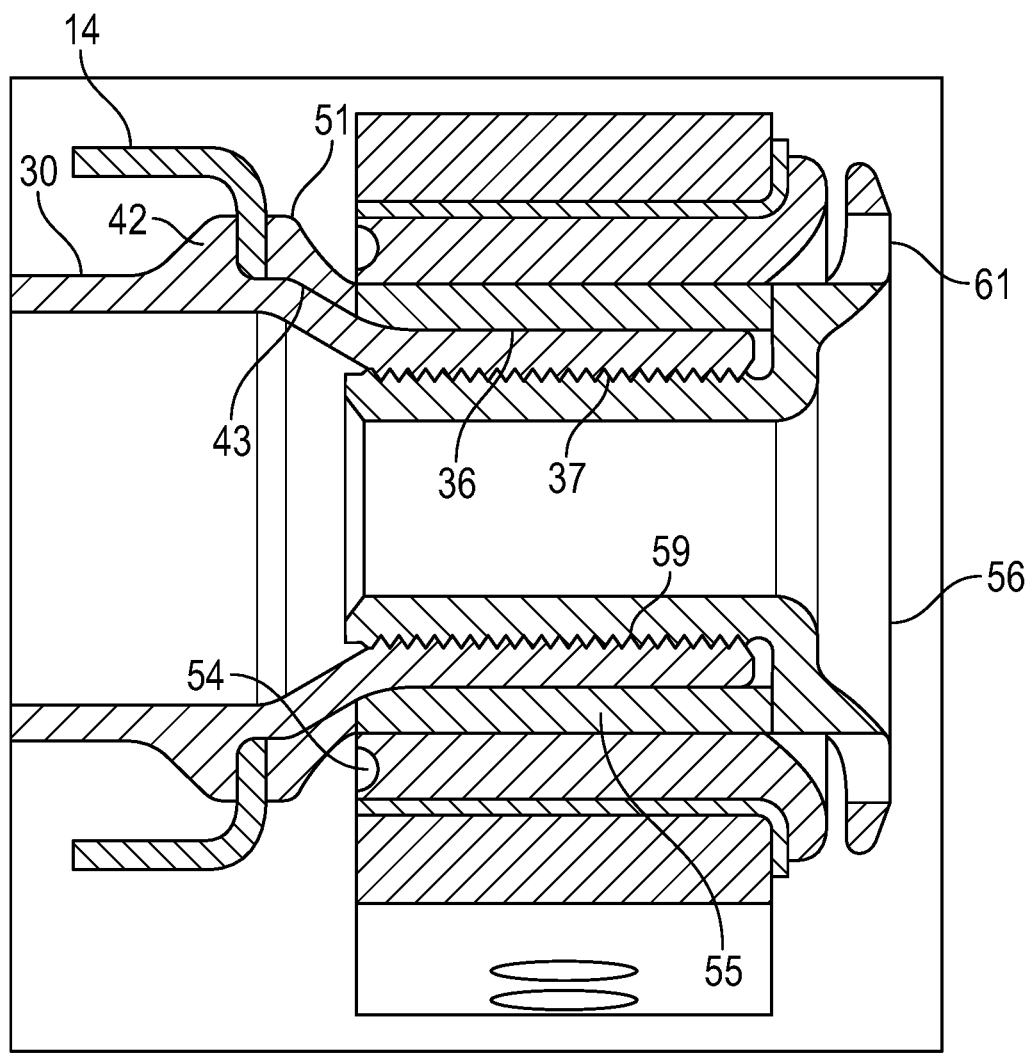
FIG. 16B is an elevation cut-away view of a portion of the control arm of FIGS. 15 and 16 with the handling bushing assembled to the control arm.

As illustrated in FIGS. 15 to 16B, a shaped ring 51 is fitted over the handling bushing seat 36 and contacts the tapered section 43 of the rod 30 and the material of the second arm component 14 surrounding the bushing seat receiving aperture 20 adjacent the first end 22 of the second arm component 14. The handling bushing 54 comprises an inner sleeve 55 which in turn is fitted over the handling bushing seat 36 and contacts the shaped ring 51. Finally, a fastener 56 with an externally threaded section 59 is threaded into the correspondingly internally threaded section 37 of the handling bushing seat 36. This fastener 56 comprises a fastener head 61 which is shaped to contact the handling bushing 54. The fastener head 61 may be shaped to allow a certain clearance from the handling bushing 54 at certain locations in order to act as a stop for deflection of the handling bushing 54 during operation of the suspension system.

When the fastener is inserted and tightened, the handling bushing 54 is held in place and the second arm component 14 is securely held to the rod 30 via the intermediate shaped ring 51. The radial clamping force generated by this arrangement sufficiently reinforces the sheet metal material of the second arm component 14 surrounding the handling bushing seat receiving aperture 20 of the second arm component 14 to facilitate effective transmission of forces during operation of the suspension system and to create a robust control arm structure.

It should be understood that although particular component arrangements are disclosed in the illustrated embodiments, other arrangements will benefit from this invention. Although particular step sequences are shown and described, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

The invention claimed is:

1. A vehicular suspension control arm comprising:
a first arm component and a separate second arm component formed from sheet metal, each arm component discrete from the other and comprising:
an outer wall and two side walls forming a U-shape;
bushing connecting means adjacent a first end;
at least one bracket receiving rivet aperture adjacent a second end;
at least one component connecting rivet aperture located between the first end and the second end;
a ride bushing and a handling bushing;
a ball joint bracket comprising bracket rivet apertures corresponding to the at least one bracket receiving rivet aperture adjacent the second end of each of the first and second arm components;
a plurality of rivets;
such that when constructed, the ball joint bracket is riveted to both the first and second arm components adjacent the second ends thereof via the at least one bracket receiving rivet aperture and the corresponding bracket rivet apertures, the first arm component is riveted to the second arm component at the corresponding at least one component connecting rivet aperture, the ride bushing is connected at the first end of the first arm component and the handling bushing is connected at the first end of the second arm component.

2. The vehicular suspension control arm of claim 1, wherein the side walls of the first and second arm components partially overlap and remain spaced apart at the first ends thereof.

3. The vehicular suspension control arm of claim 1, wherein at least one spacer maintains a spacing between the side walls of both the first and second arm components at the at least one arm component rivet apertures.

4. The vehicular suspension control arm of claim 1, wherein the first and second arm components are riveted at three arm component rivet apertures.

5. The vehicular suspension control arm of claim 4, wherein one of the three arm component rivet apertures is located adjacent the second end of the arm components, and the ball joint bracket is riveted to each of the first and second arm components at said one of three arm component rivet apertures.

6. The vehicular suspension control arm of claim 1, wherein the ride bushing comprises a bracket which is riveted to the first end of the first arm component.

7. A vehicular suspension control arm comprising:
a first arm component and a second arm component formed from sheet metal, each arm component comprising:
an outer wall and two side walls forming a U-shape;
bushing connecting means adjacent a first end;
at least one bracket receiving rivet aperture adjacent a second end;
at least one component connecting rivet aperture located between the first end and the second end;
a ride bushing and a handling bushing;
a ball joint bracket comprising bracket rivet apertures corresponding to the at least one bracket receiving rivet aperture adjacent the second end of each of the first and second arm components;
a plurality of rivets;
such that when constructed, the ball joint bracket is riveted to both the first and second arm components adjacent the second ends thereof via the at least one bracket receiving rivet aperture and the corresponding bracket rivet apertures, the first arm component is riveted to the second arm component at the corresponding at least one component connecting rivet aperture, the ride bushing is connected at the first end of the first arm component and the handling bushing is connected at the first end of the second arm component
a third arm component formed from sheet metal comprising:
an outer wall and two side walls;
two ends, each end comprising at least one third arm component rivet aperture;
a ride bushing seat component and a handling bushing seat component;
wherein the third arm component is adapted to be riveted to each of the first arm component and the second arm component adjacent the first ends of the first and second arm components, and to both the ride bushing seat component and the handling bushing seat component adjacent the respective ends of the third arm component.

8. A vehicular suspension control arm comprising:
a first arm component and a second arm component formed from sheet metal, each arm component comprising:
an outer wall and two side walls forming a U-shape;
bushing connecting means adjacent a first end;
at least one bracket receiving rivet aperture adjacent a second end;
at least one component connecting rivet aperture located between the first end and the second end;
a ride bushing and a handling bushing;
a ball joint bracket comprising bracket rivet apertures corresponding to the at least one bracket receiving rivet aperture adjacent the second end of each of the first and second arm components;
a plurality of rivets;
such that when constructed, the ball joint bracket is riveted to both the first and second arm components adjacent the second ends thereof via the at least one bracket receiving rivet aperture and the corresponding bracket rivet apertures, the first arm component is riveted to the second arm component at the corresponding at least one component connecting rivet aperture, the ride bushing is connected at the first end of the first arm component and the handling bushing is connected at the first end of the second arm component;
wherein the bushing connecting means comprises an integral bushing stud receiving aperture adjacent the first end of each of the first arm component and the second arm component, and wherein the control arm further comprises a rod comprising a ride bushing stud at a first rod end, a handling bushing stud at a second rod end, and first and second seating surfaces located interiorly along the rod adjacent the studs adapted to contact the first and second arm components when the respective studs extend through the bushing stud receiving apertures, such that when constructed, the ride bushing stud extends through the bushing stud receiving aperture of the first arm component, the handling bushing stud extends through the bushing stud receiving aperture of the second arm component, and the first and second arm components respectively contact the first and second seating surfaces of the rod.

9. The vehicular suspension control arm of claim 8, wherein the rod is tubular.

10. The vehicular suspension control arm of claim 8, wherein the handling bushing stud is interiorly threaded to accept a correspondingly exteriorly threaded fastener and comprises the exterior handling bushing seat, an exterior second contacting surface formed as a shoulder on the handling bushing stud and a tapered portion, and the control arm further comprises a shaped ring which fits over and onto the handling bushing stud and sits on the tapered portion to hold the second arm component against the second contacting surface when the handling bushing is fastened to the handling bushing stud.

11. A vehicular suspension control arm comprising:
a first arm component and a second arm component formed from sheet metal, each arm component comprising:
an outer wall and two side walls forming a U-shape;
bushing connecting means adjacent a first end;
at least one bracket receiving rivet aperture adjacent a second end;
at least one component connecting rivet aperture located between the first end and the second end;
a ride bushing and a handling bushing;
a ball joint bracket comprising bracket rivet apertures corresponding to the at least one bracket receiving rivet aperture adjacent the second end of each of the first and second arm components;
a plurality of rivets;
such that when constructed, the ball joint bracket is riveted to both the first and second arm components adjacent the second ends thereof via the at least one bracket receiving rivet aperture and the corresponding bracket rivet apertures, the first arm component is riveted to the second arm component at the corresponding at least one component connecting rivet aperture, the ride bushing is connected at the first end of the first arm component and the handling bushing is connected at the first end of the second arm component;
wherein the handling bushing is stabilized by contact with a reinforcement sheet metal stamping riveted to at least one of the first and second arm components adjacent the first end of the second arm component.

12. A vehicular suspension control arm comprising:
a first arm component and a second arm component formed from sheet metal, each arm component comprising:
an outer wall and two side walls;
an integral bushing seat receiving aperture adjacent a first end;
at least one bracket receiving rivet aperture adjacent a second end;
at least one component connecting rivet aperture located between the first and the second end;
a rod comprising a ride bushing seat at a first end, a handling bushing seat at a second end, and first and second contacting surfaces located interiorly of the seats along the rod adjacent the seats adapted to contact the first and second arm components when the respective seats extend through the seat receiving apertures;
a ball joint bracket comprising bracket rivet apertures corresponding to the bracket receiving rivet apertures adjacent the second ends of the first and second arm components;
a plurality of rivets;
such that when constructed, the ride bushing seat extends through the seat receiving aperture of the first component, the handling bushing seat extends through the seat receiving aperture of the second component, the first and second arm components contact the first and second contacting surfaces of the rod, the ball joint bracket is riveted to both the first and second arm components adjacent the second ends thereof via the bracket receiving rivet apertures and the corresponding bracket rivet apertures, and the first arm component is riveted to the second arm component at the corresponding at least one arm component connecting rivet aperture.

13. The vehicular suspension control arm of claim 12, wherein the side walls of the first and second arm components are spaced apart at the first ends thereof.

14. The vehicular suspension control arm of claim 13, wherein at least one spacer maintains a spacing between the side walls of both the first and second arm components at the at least one arm component rivet apertures.

15. The vehicular suspension control arm of claim 14, wherein the first and second arm components are riveted at three arm component rivet apertures.

16. The vehicular suspension control arm of claim 15, wherein one of the three arm component rivet apertures is located adjacent the second end of the arm components, and the ball joint bracket is riveted to each of the first and second arm components at said rivet apertures.

17. The vehicular suspension control arm of claim 12, wherein the rod is tubular.

* * * * *